United States Patent
Isobe et al.

(10) Patent No.: US 10,277,391 B2
(45) Date of Patent: Apr. 30, 2019

(54) ENCRYPTION DEVICE, ENCRYPTION METHOD, DECRYPTION DEVICE, AND DECRYPTION METHOD

(71) Applicants: Sony Corporation, Tokyo (JP);
Technical University of Denmark, Kgs. Lyngby (DK)

(72) Inventors: Takanori Isobe, Tokyo (JP); Andrey Bogdanov, Kongens Lyngby (DK)

(73) Assignees: SONY CORPORATION, Tokyo (JP); TECHNICAL UNIVERSITY OF DENMARK, Kgs. Lyngby (DK)

( * ) Notice: Subject to any disclaimer, the term of this patent is extended or adjusted under 35 U.S.C. 154(b) by 284 days.

(21) Appl. No.: 15/255,693

(22) Filed: Sep. 2, 2016

(65) Prior Publication Data
US 2017/0294148 A1    Oct. 12, 2017

(30) Foreign Application Priority Data
Apr. 8, 2016    (JP) ................. 2016-078386

(51) Int. Cl.
*H04L 9/00*    (2006.01)
*H04L 9/06*    (2006.01)

(52) U.S. Cl.
CPC ............ *H04L 9/002* (2013.01); *H04L 9/0625* (2013.01); *H04L 9/0631* (2013.01); *H04L 2209/16* (2013.01); *H04L 2209/60* (2013.01)

(58) Field of Classification Search
CPC ...................................................... H04L 9/002
See application file for complete search history.

(56) References Cited

U.S. PATENT DOCUMENTS

| | | | |
|---|---|---|---|
| 2002/0021802 A1* | 2/2002 | Muratani | H04L 9/002 380/29 |
| 2010/0061548 A1* | 3/2010 | Shirai | H04L 9/002 380/28 |
| 2012/0042170 A1* | 2/2012 | Curtin | G06F 21/77 713/185 |
| 2017/0149559 A1* | 5/2017 | Michiels | H04L 9/004 |

OTHER PUBLICATIONS

S. Chow et al. "A White-Box DES Implementation for DRM Applications", Pre-Proceedings for ACM DRM-2002 Workshop, Oct. 15, 2002, 16 pages.

S. Chow et al. "White-Box Cryptography and an AES Implementation", Revision to appear in the post-proceedings of the 9th Annual Workshop on Selected Areas in Cryptography (SAC'02), Aug. 15-16, 2002, 18 pages.

Alex Biryukov et al. "Cryptographic Schemes Based on the ASASA Structure: Black-box, White-box, and Public-key" ASIACRYPT, 2014, 21 pages.

* cited by examiner

*Primary Examiner* — Longbit Chai
(74) *Attorney, Agent, or Firm* — Oblon, McClelland, Maier & Neustadt, L.L.P.

(57) ABSTRACT

There is provided an encryption device including a data encryption unit configured to conduct encryption on the basis of a white box model in which at least a part of a plurality of round functions for sequentially conducting encryption processing on an input value is tabulated, and input and output values of the round function are recognizable from an outside. The plurality of round functions each have an encryption function that is tabulated and encrypts an input value in a black box model in which input and output values are recognizable from the outside and an intermediate value is not recognizable from the outside.

14 Claims, 30 Drawing Sheets

FIG. 8

| | OVERALL CONFIGURATION | TYPE OF F FUNCTION / S FUNCTION | POSSIBILITY OF CHANGE IN Table size |
|---|---|---|---|
| CONFIGURATION B | Feistel | SINGLE | No |
| CONFIGURATION C | SPN | SINGLE | No |
| CONFIGURATION D | Feistel | MULTIPLE | Yes |
| CONFIGURATION E | SPN | MULTIPLE | Yes |

FIRST F FUNCTION(n/d-bit INPUT, n - n/d-bit OUTPUT)
SECOND F FUNCTION(2n/d-bit INPUT, n -2n/d-bit OUTPUT)
THIRD F FUNCTION(3n/d-bit INPUT, n - 3n/d-bit OUTPUT)
FOURTH F FUNCTION(4n/d-bit INPUT, n - 4n/d-bit OUTPUT)

FIRST S FUNCTION(n/d bits to n - n/d bits)
SECOND S FUNCTION(2n/d bits to n - 2n/d bits)
THIRD S FUNCTION(4n/d bits to n - 4n/d bits)

ENCRYPTION DEVICE, ENCRYPTION METHOD, DECRYPTION DEVICE, AND DECRYPTION METHOD

CROSS REFERENCE TO RELATED APPLICATIONS

This application claims the benefit of Japanese Priority Patent Application JP 2016-078386 filed Apr. 8, 2016, the entire contents of which are incorporated herein by reference.

BACKGROUND

The present disclosure relates to an encryption device, an encryption method, a decryption device, and a decryption method.

As the related art, for example, S. Chow, P. Eisen, H. Johnson, P. C. van Oorschot "A white-box DES implementation for DRM applications." DRM 2002 and S. Chow, P. Eisen, H. Johnson, P. C. van Oorschot "White-Box Cryptography and an AES Implementation?" SAC 2002 each describe a method for securely transforming the existing block ciphers even in the white-box model. The methods described in S. Chow, P. Eisen, H. Johnson, P. C. van Oorschot "A white-box DES implementation for DRM applications." DRM 2002 and S. Chow, P. Eisen, H. Johnson, P. C. van Oorschot "White-Box Cryptography and an AES Implementation?" SAC 2002 relate to the white-box implementation of the existing algorithms (DES and AES), and the technique of transforming an operation into a lookup table having a large size and embedding a secret key into the table to ensure the security of the internal operation visible to the outside.

According to the methods described in S. Chow, P. Eisen, H. Johnson, P. C. van Oorschot "A white-box DES implementation for DRM applications." DRM 2002 and S. Chow, P. Eisen, H. Johnson, P. C. van Oorschot "White-Box Cryptography and an AES Implementation?" SAC 2002, the value of a secret key is included in a table, and then a keyed table is generated. In order to enhance the security of each table, a secret non-linear function is added before and after the table. Meanwhile, the function IN and the function OUT are added before and after the encryption algorithm E as External Encoding.

A. Biryukov, C. Bouillaguet, D. Khovratovich:"Cryptographic Schemes Based on the SAAS Structure: Black-Box, White-Box, and Public-Key", ASIACRYPT 2014 describes a method for configuring a table for a problem expected to be difficult to decompose, and configuring a block cipher, which is also secure in the white-box model. Specifically, the method described in A. Biryukov, C. Bouillaguet, D. Khovratovich: "Cryptographic Schemes Based on the ASASA Structure: Black-Box, White-Box, and Public-Key", ASIACRYPT 2014 configures a table for a white-box by overlaying a secret non-linear function (S layer) and a secret linear function (A layer), and more specifically, configures a table for a white-box by overlaying a three-layered secret linear function (A layer) and a two-layered secret non-linear function (S layer).

SUMMARY

However, it is necessary in the methods described in S. Chow, P. Eisen, H. Johnson, P. C. van Oorschot "A white-box DES implementation for DRM applications." DRM 2002 and S. Chow, P. Eisen, H. Johnson, P. C. van Oorschot "White-Box Cryptography and an AES Implementation?" SAC 2002 to add a new function to an input and output of the encryption function E as external encoding in order to enhance the security, and the security is unfortunately diminished greatly without external encoding. This results in a function different from the original encryption function E. Furthermore, even if external encoding is added, a practical attack method has been proposed.

More specifically, the technique described in S. Chow, P. Eisen, H. Johnson, P. C. van Oorschot "A white-box DES implementation for DRM applications." DRM 2002 and S. Chow, P. Eisen, H. Johnson, P. C. van Oorschot "White-Box Cryptography and an AES Implementation?" SAC 2002 is a white-box technique based on AES and DES. However, when external encoding is used, encryption in the white-box model results in a different cipher algorithm. Accordingly, this is not pure AES white box implementation, but means that a different cipher algorithm is implemented. Furthermore, when encoded plaintext is decoded, it is necessary to decode plaintext encoded in another secure domain in the same device into normal text. In other words, space that allows for secure operations is necessary in environments in which white-box implementation is necessary, which is incompatible with the white-box model. Accordingly, applications are unfortunately limited. When external encoding is not used, it is not possible to partially use external encoding to the first round and the final round, which unfortunately diminishes the security greatly. Even if external encoding is added, a practical attack method has been proposed.

The method described in A. Biryukov, C. Bouillaguet, D. Khovratovich: "Cryptographic Schemes Based on the ASASA Structure: Black-Box, White-Box, and Public-Key", ASIACRYPT 2014 is unfortunately incapable of qualitatively evaluating security, and a practical attack method has already been proposed. Although security can be enhanced by repeating functional processing more as a possible approach, studies on the method for configuring a function by overlaying a secret non-linear function (S layer) and a secret linear function (A layer) have such a short history that it is difficult to qualitatively evaluate security.

It is then desirable to ensure the confidentiality of a secret key and to securely conduct an encryption operation in the white-box model.

According to an embodiment of the present disclosure, there is provided an encryption device including: a data encryption unit configured to conduct encryption on the basis of a white box model in which at least a part of a plurality of round functions for sequentially conducting encryption processing on an input value is tabulated, and input and output values of the round function are recognizable from an outside. The plurality of round functions each have an encryption function that is tabulated and encrypts an input value in a black box model in which input and output values are recognizable from the outside and an intermediate value is not recognizable from the outside.

According to another embodiment of the present disclosure, there is provided an encryption method including: conducting encryption on the basis of a white box model in which at least a part of a plurality of round functions for sequentially conducting encryption processing on an input value is tabulated, and input and output values of the round function are recognizable from an outside. The plurality of round functions each encrypt an input value on the basis of an encryption function that is tabulated in a black box model in which input and output values are recognizable from the outside and an intermediate value is not recognizable from the outside.

According to still another embodiment of the present disclosure, there is provided a decryption device including: a data decryption unit configured to conduct decryption by an inverse operation of encryption processing of conducting encryption on the basis of a white box model in which at least a part of a plurality of round functions for sequentially conducting encryption processing on an input value is tabulated, and input and output values of the round function are recognizable from an outside. The plurality of round functions each encrypt an input value on the basis of an encryption function that is tabulated in a black box model in which input and output values are recognizable from the outside and an intermediate value is not recognizable from the outside.

According to yet another embodiment of the present disclosure, there is provided a decryption method including: conducting decryption by an inverse operation of encryption processing of conducting encryption on the basis of a white box model in which at least a part of a plurality of round functions for sequentially conducting encryption processing on an input value is tabulated, and input and output values of the round function are recognizable from an outside. The plurality of round functions each encrypt an input value on the basis of an encryption function that is tabulated in a black box model in which input and output values are recognizable from the outside and an intermediate value is not recognizable from the outside.

According to one or more of embodiments of the present disclosure described above, it is possible to preserve the confidentiality of a key and to enhance the confidentiality of data by conducting a secure encryption operation in the white box model.

Note that the effects described above are not necessarily limited, and along with or instead of the effects, any effect that is desired to be introduced in the present specification or other effects that can be expected from the present specification may be exhibited.

BRIEF DESCRIPTION OF THE DRAWINGS

FIG. 8 is a schematic diagram illustrating an overall configuration, a type of F function/S function, and possibility of change in a table size for specific examples (B), (C), (D), and (E);

DETAILED DESCRIPTION OF THE EMBODIMENT(S)

Figure 1:
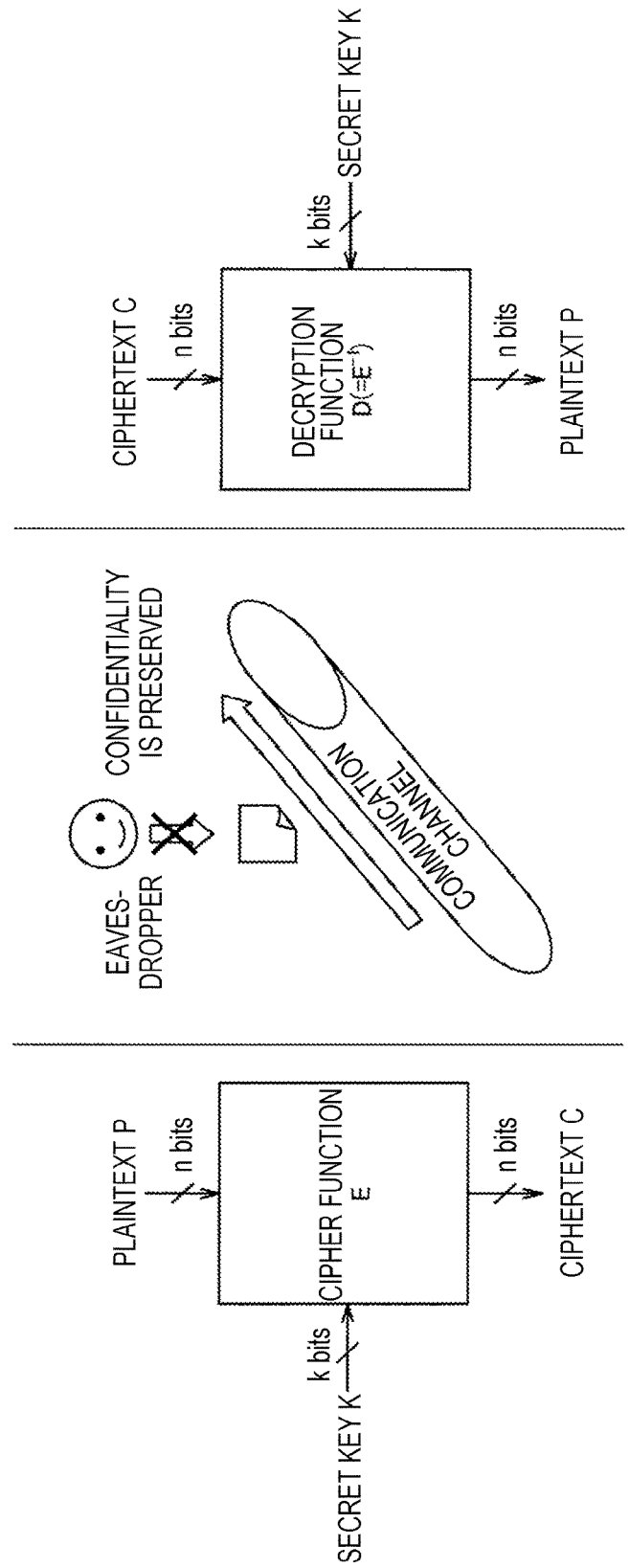
FIG. 1 is a schematic diagram illustrating a common key block cipher.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

A description will be now made in the following order.
1. Prerequisite Techniques
2. Overview of the Present Embodiment
3. Specific Configuration Examples
   3.1. Specific Example (B)
   3.2. Specific Example (C)
   3.3. Specific Example (D)
   3.4. Specific Example (E)
4. Configuration Example for Decryption
5. Differences from Related Art
   5.1. Difference from Related Art 1
   5.2. Difference from Related Art 2
6. Security Achieved by Encryption according to the Present Embodiment
7. Example of Application to which the Present Embodiment is Applied

1. Prerequisite Techniques

The common key block cipher technique has been known, by which the same key is used for encryption and decryption. FIG. 1 is a schematic diagram illustrating a common key block cipher, and illustrates an n-bit common key block cipher algorithm E corresponding to a key length of k bits. A secret key K of k bits is used to encrypt plaintext P (n bits) on the basis of a cipher function E and to generate ciphertext C (n bits). The secret key K of k bits is used to decrypt the ciphertext C (n bits) on the basis of a decryption function D ($=E^{-1}$) and to generate the plaintext P (n bits). This common key block cipher can preserve the confidentiality of plaintext from eavesdroppers (who will also be referred to as attackers) when data are transmitted to, for example, a communication channel as illustrated in FIG. 1.

The bit lengths of the plaintext P and the ciphertext C are each referred to as a block size, and represented herein as n. Any integer is possible as the value of n, and a single integer is decided in advance for each block cipher algorithm in most cases. A block cipher having a block length of n will also be referred to as n-bit block cipher. The bit length of the secret key K is represented as k, and the bit length k of the key can have any integer value. Common key block cipher algorithms correspond to one or more key sizes. For example, a block cipher algorithm A has a block size of n=128, and can correspond to a key size of k=128, k=192, or k=256.

A decryption algorithm D corresponding to the encryption algorithm E can be defined as an inverse function $E^{-1}$ of the encryption algorithm E, and receives the ciphertext C and the key K as an input and outputs the plaintext P.

Figure 2:
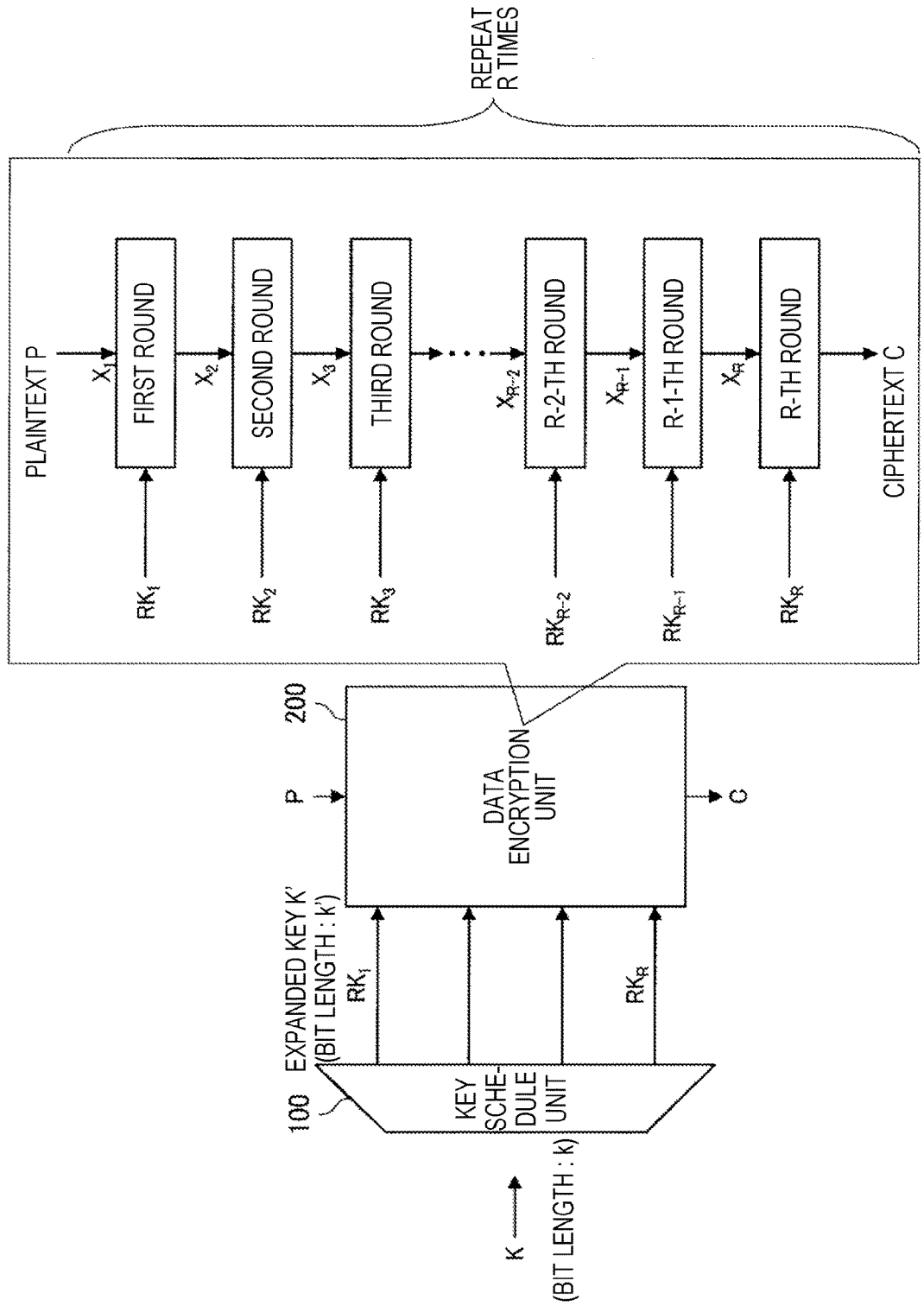
FIG. 2 is a schematic diagram illustrating an internal configuration of a block (cipher function E) for encryption.

FIG. 2 is a schematic diagram illustrating the internal configuration of a block (cipher function E) for encryption. The cipher function E includes a key schedule unit 100 and a data encryption unit 200. The key schedule unit 100 uses the key K as an input, and outputs an expanded key K' (bit length k') obtained by expanding the bit length through given steps. The data encryption unit 200 receives the plaintext P, receives the expanded key K' from the key schedule unit 100, transforms the data, and outputs the ciphertext C. The data encryption unit 200 repeatedly processes round functions obtained from the expanded key K' for encryption.

The data encryption unit 200 can be divided into round functions serving as processing units. A round function receives two pieces of data as inputs, processes the data inside, and then outputs a piece of data. A piece of the input data is n-bit data that are being encrypted, and the output of the round function in a round is supplied as an input of the next round function. The other piece of the input data is partial data of the expanded key K' output from the key schedule unit 100, and the key data are referred to as round key. The total number of round functions is referred to as total number of rounds. The total number of rounds represents a value decided in advance for each cipher algorithm. Herein, the total number of rounds is represented as R. If the input data of the first round from the input side of the data encryption unit 200 are represented as $X_1$, and the data input to the i-th round function are represented as Xi and the round key is represented as RKi, the configuration of the data encryption unit 200 is as illustrated in FIG. 2.

Round functions can have a variety of structures in accordance with a block cipher algorithm. Round functions can be categorized in accordance with the structure adopted by the cipher algorithm. Herein, the SPN structure, the Feistel structure, and the extended Feistel structure are exemplified as the typical structures.

Figure 3:
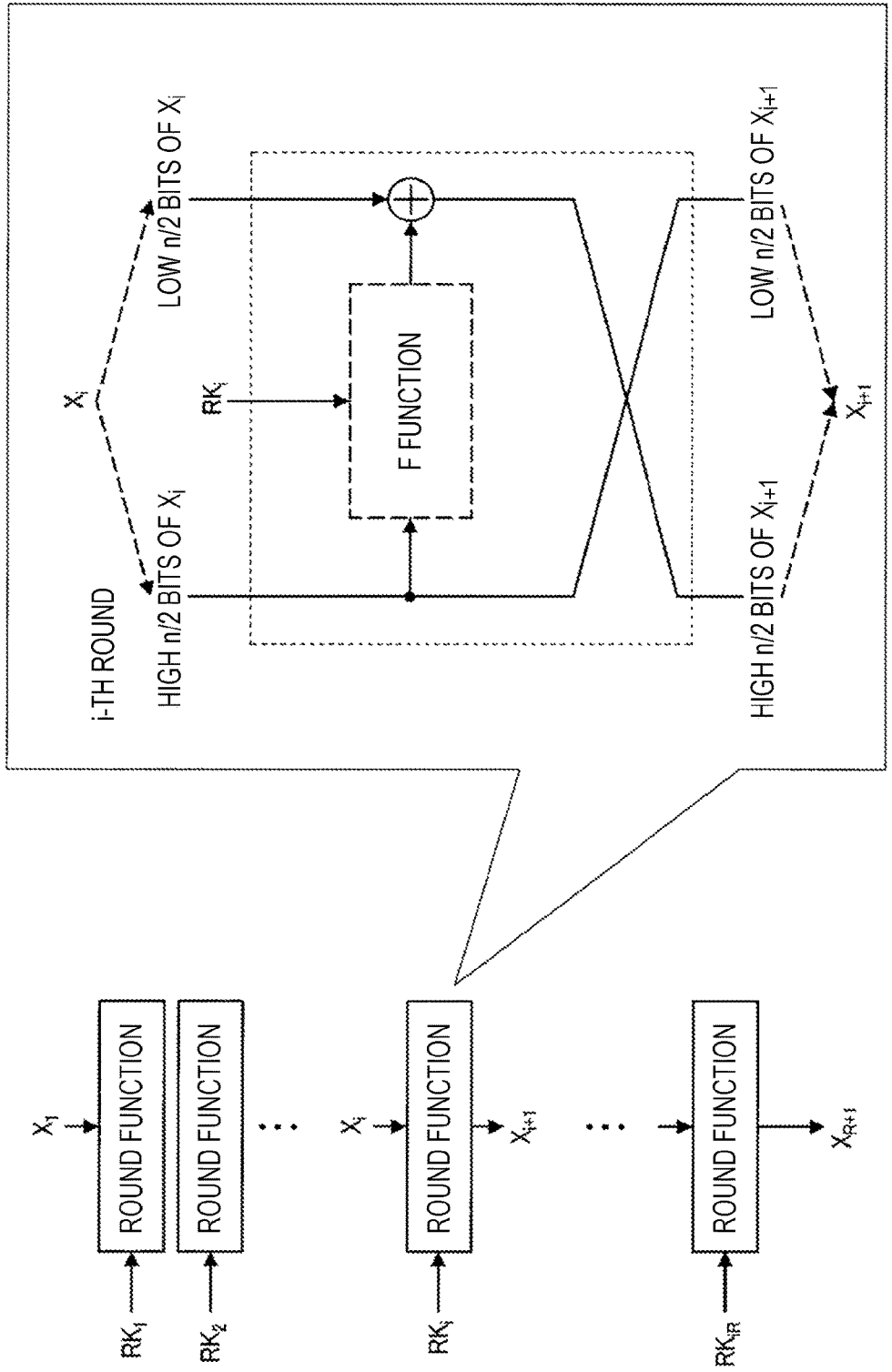
FIG. 3 is a schematic diagram illustrating a Feistel structure.
Figure 4:
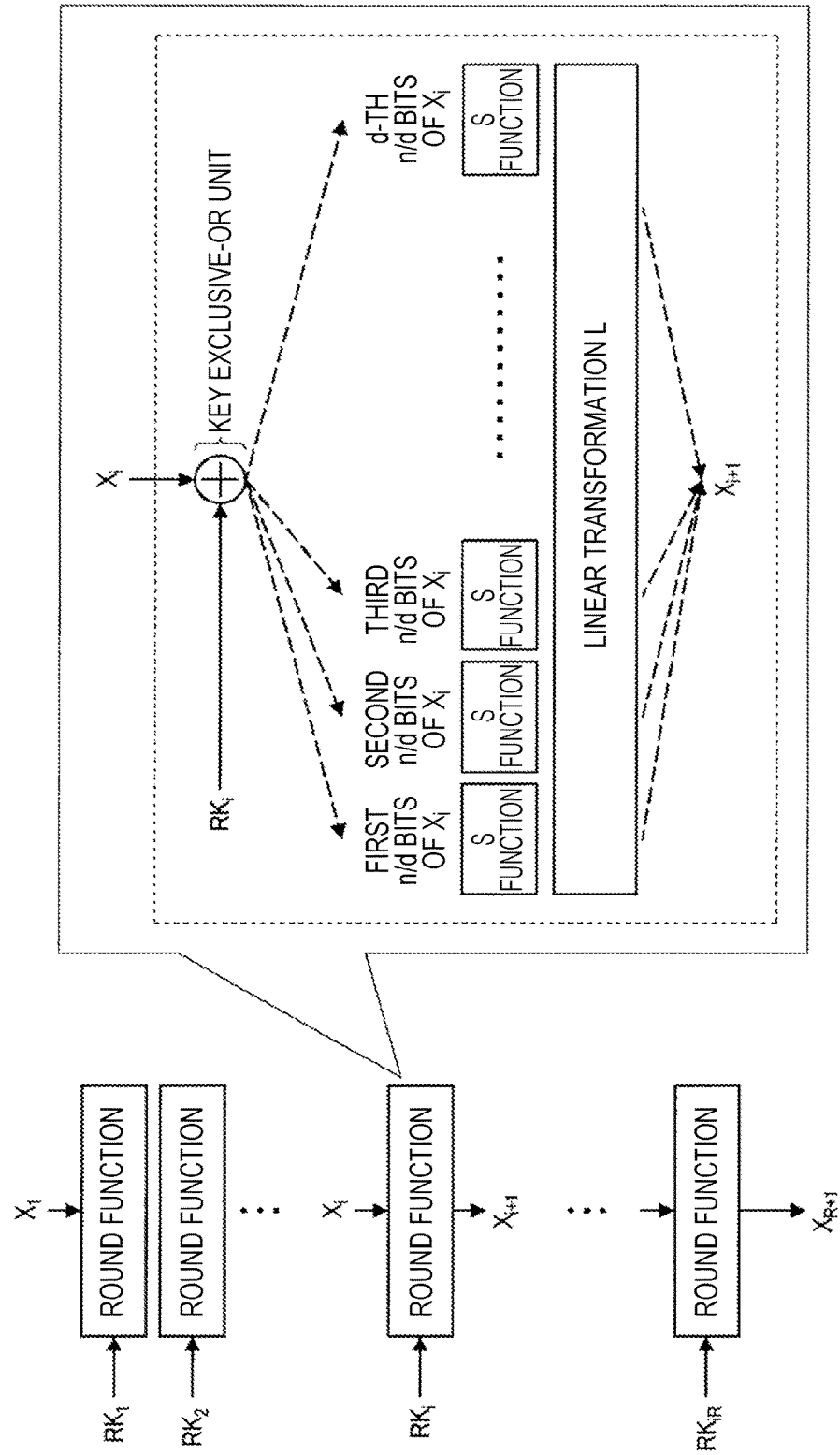
FIG. 4 is a schematic diagram illustrating an SPN structure.

FIG. 3 is a schematic diagram illustrating a Feistel structure. FIG. 4 is a schematic diagram illustrating an SPN structure. In the example of the basic configuration of the Feistel structure illustrated in FIG. 3, input data $X_i$ of n bits are divided into the high n/2 bits and the low n/2 bits in each round function, and the data of each line have a size of n/2 bits. The high n/2 bits are input into the F function, and n/2 bits are output. These outputs are exclusive-ORed with the low n/2 bits. Afterwards, the left and right of the data are exchanged to obtain output data $X_{i+1}$. The F function is configured on the basis of a non-linear function. Different from the SPN structure, the F function does not have to be a permutation. Generally speaking, the F function is not generated from a block cipher, but a non-linear operation, which imposes a light computation load. However, the F function is generated from a block cipher in the present embodiment.

Although data are divided into two in the Feistel structure, data are extendedly divided into three or more in the extended Feistel structure (generalized Feistel structure). If the number of data that are divided is represented as d, it is possible to define a variety of extended Feistel structures on the basis of the number d of divided data. The input and output sizes of an F function relatively decrease, and it is thus suitable for small implementation. Each round function can also have a plurality of F functions.

Figure 14:
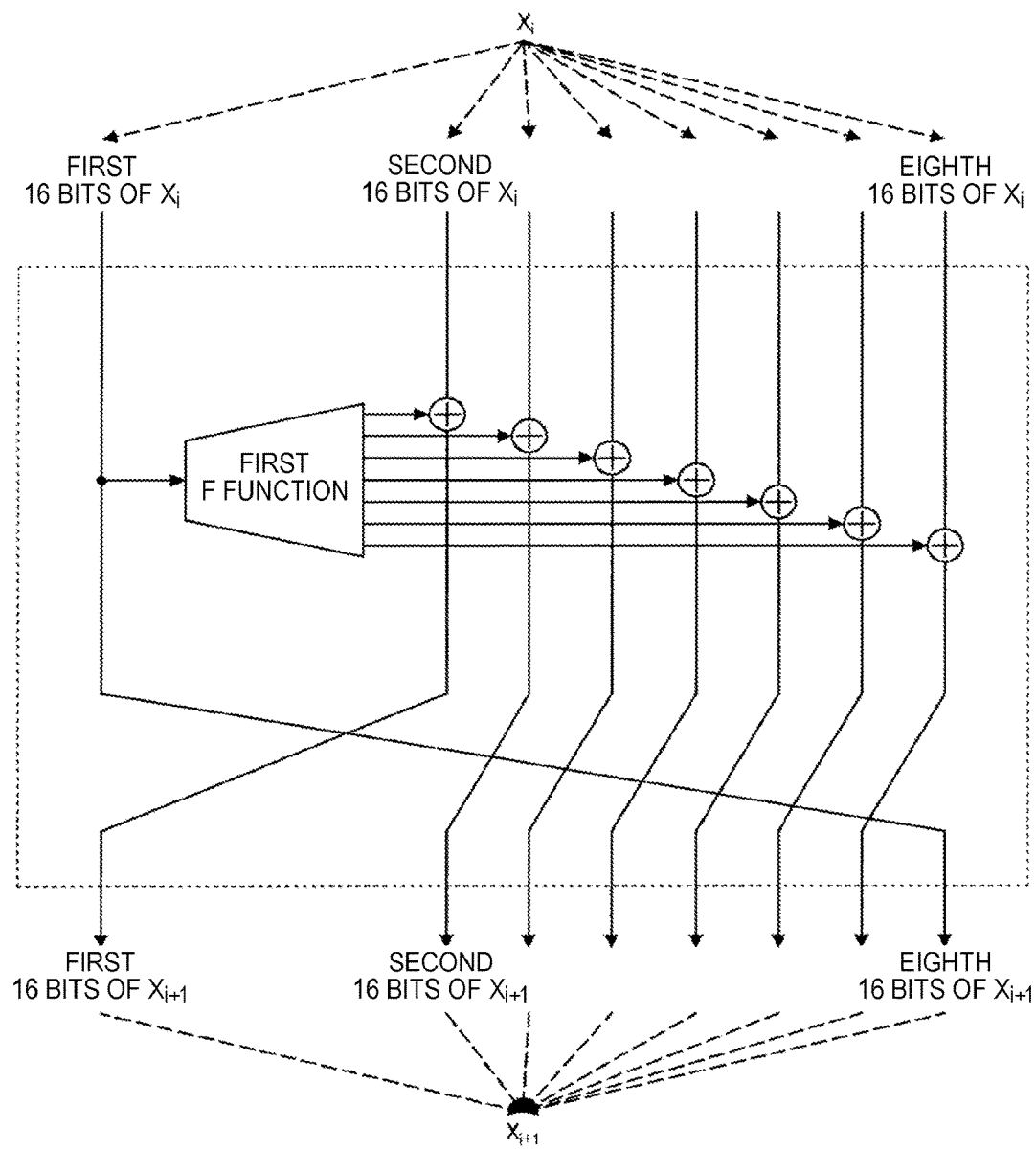
FIG. 14 is a schematic diagram illustrating an overall configuration for $n=128$, $c=1$, and $d=8$ in FIG. 10.
Figure 17:
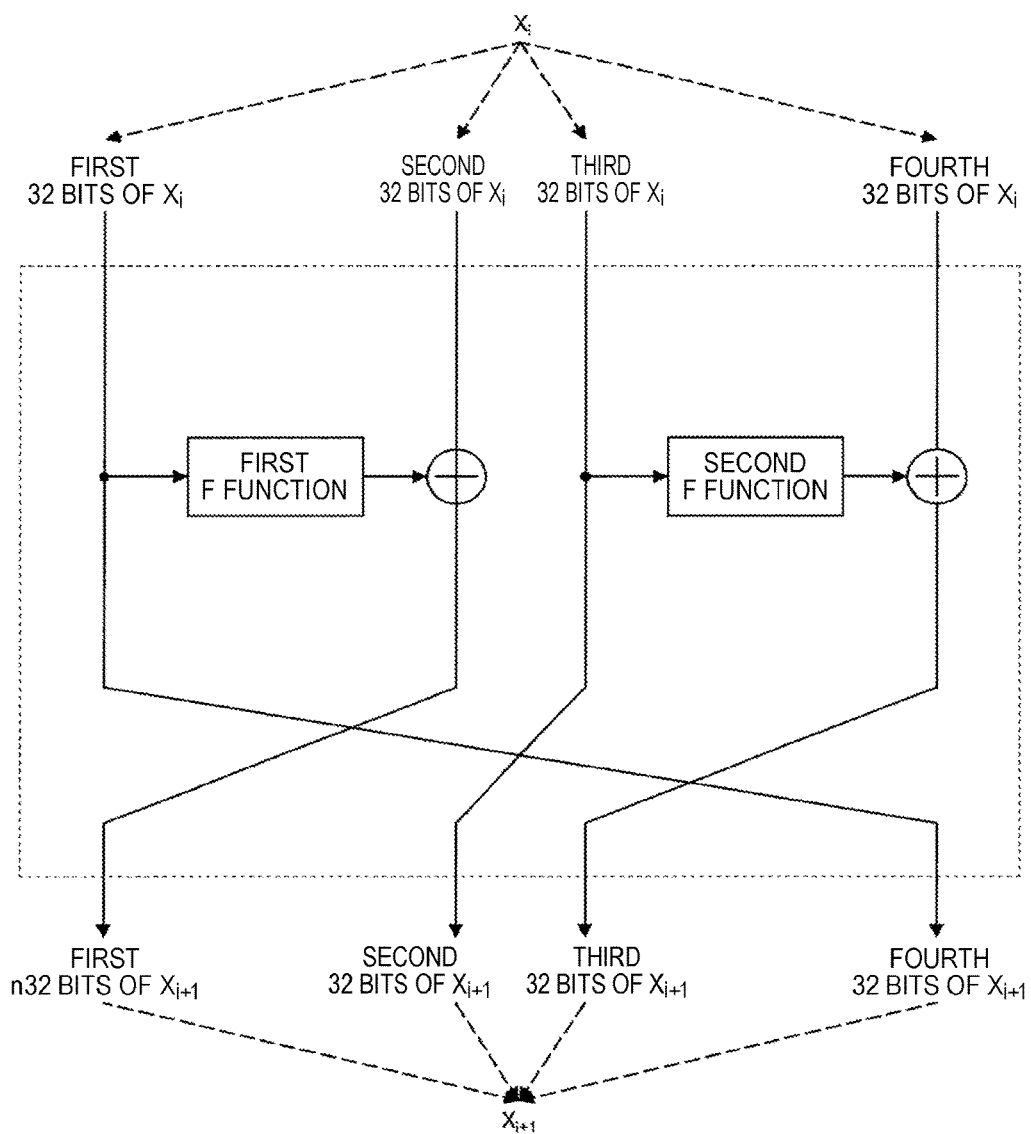
FIG. 17 is a schematic diagram illustrating an example in which there are two F functions in a single round, and n is equal to 128 and d is equal to 4.

FIG. 17 discussed below illustrates an example of the extended Feistel structure in which d is equal to 4, and two F functions are applied to a single round in parallel. In this example, a first F function and a second F function respectively have $RK1_i$ and $RK2_i$ as key inputs. FIG. 14 discussed below illustrates an example of the extended Feistel structure in which d is equal to 8, and a single F function is applied to a single round in parallel. In this example, the F function has an input size of n/8 bits, and the F function has an output size of 7n/8 bits. The output is divided into seven pieces of n/8-bit data, and exclusive-ORed with the remaining seven pieces of 16-bit data. Additionally, n is equal to 128 bits.

In the example of the basic configuration of the SPN structure illustrated in FIG. 4, an operation of exclusive-OR with a round key, a non-linear transformation operation, a linear transformation operation, and the like are applied to all the input data of n bits. A non-linear transformation unit is referred to as substitution-layer (S layer) and a linear transformation unit is referred to as permutation-layer (P layer), each of which is a permutation (bijective function). Each round function has the input data Xi of n bits divided into d pieces of data, and the data of each line have a size of n/d [bits]. Herein, a non-linear transformation operation is defined as an S function, and a non-linear transformation operation substitution-layer (S layer) having an input and output of n/d [bits] is executed for each of the data. Afterwards, a linear transformation L having an input and output of n bits is executed as a linear transformation permutation-layer (P layer). Additionally, the linear transformation operation is defined as an L function.

Figure 5:
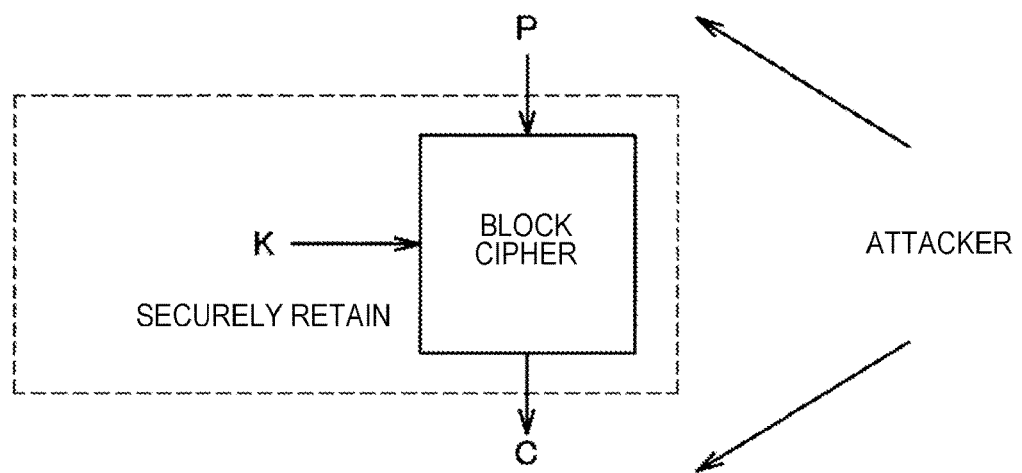
FIG. 5 is a schematic diagram illustrating a black box model including a common key block cipher.

There are a black box model and a white box model as security models of a block cipher. FIG. 5 is a schematic diagram illustrating a black box model including a common key block cipher. Although an attacker seeking for a secret key is capable of recognizing and freely controlling an input and output of a block cipher, the attacker is incapable of recognizing an intermediate value of the block cipher in the black box model. In other words, the black box model is a security model in which an attacker is capable of accessing only the plaintext P and the ciphertext C, which are respectively an input and an output of a block cipher algorithm. Attacks carried out by an attacker can be categorized into a known plaintext and ciphertext attach where an attacker just knows the values of the pair of the plaintext P and the cipher text C, and a chosen plaintext and ciphertext attack where an attacker can additionally control the values in itself freely. The black box model presumes that a cipher operation in itself is securely executed, and an attacker is incapable of seeing or tampering an intermediate value of the cipher. The black box model is used, for example, when the tamper resistance of cipher operations is ensured by use of hardware support. A method for implementing a cipher algorithm for a black box is referred to as black box implementation. The black box model allows for a secure design where a secret key is hidden from an attacker. In the black box model, a block cipher is designed in a manner that it is difficult to obtain the secret key K because of the amount of computation (key recovery attack resistance), and it is difficult to distinguish the block cipher from a pseudorandom keyed permutation because of the amount of computation (distinguishing attack resistance). A block cipher, which is secure in the black box model, can be implemented by encryption techniques such as AES, CLEFIA, PRESENT, and Piccolo.

Figure 6:
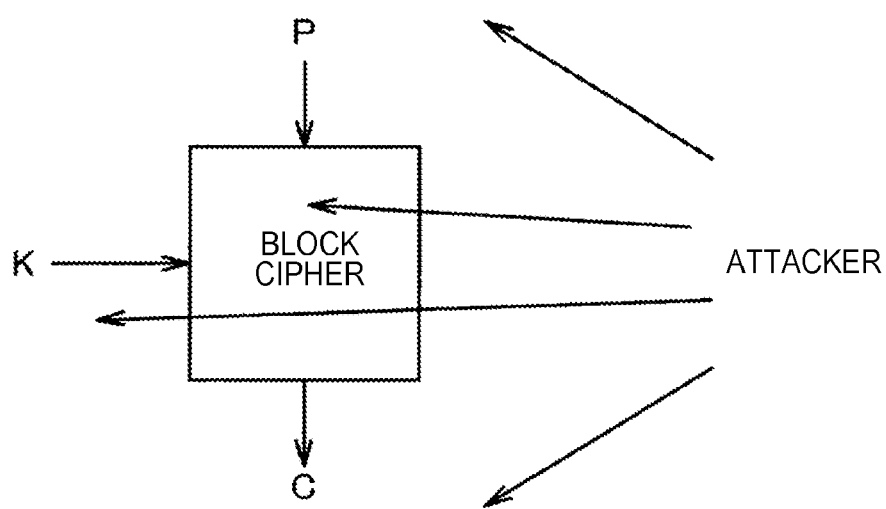
FIG. 6 is a schematic diagram illustrating a white box model including a common key block cipher.

FIG. 6 is a schematic diagram illustrating a white box model including a common key block cipher. The white box model is a security model against attackers stronger than those of the black box model, and an attacker can freely access not only the plaintext P serving as an input of a block cipher algorithm, and the ciphertext serving as an output of the block cipher algorithm, but also an intermediate value of an operation. The white box model presumes that an attacker can freely control the plaintext P serving as an input of a block cipher and the ciphertext C, and further see and tamper any intermediate value being operated. The white box model is used when tamper resistance is not ensured because of implementation constraints caused by all software (no hardware support). The white box model is also used when an intermediate value leaks because of implementation vulnerability such as a buffer overflow and malware. A method for implementing a cipher algorithm for a white box is referred to as white box implementation. According to the white box implementation, it is also possible to configure a block cipher with software alone.

In this way, an attacker is capable of recognizing and freely controlling an input and output of a block cipher, and recognizing and freely controlling an intermediate value of the block cipher in the white box model. It has to be difficult in the white box model for an attacker to obtain the key K from the perspective of the amount of computation. The white box model also has to be resistant to an attack (referred to as code lifting) where an attacker directly uses a code itself as a big key instead of obtaining the key K. The white box model, in which an attacker can recognize an intermediate value of a block cipher, has to be quantitatively secure against such attacks.

2. Overview of the Present Embodiment

The present embodiment proposes a technique of secure encryption and decryption, and a technique of protecting a secret key in an unreliable execution environment in the above-described white box model. As examples of the unreliable environment, it is not possible to securely keep a secret key, and an attacker can recognize an intermediate value of an encryption operation.

Figure 7:
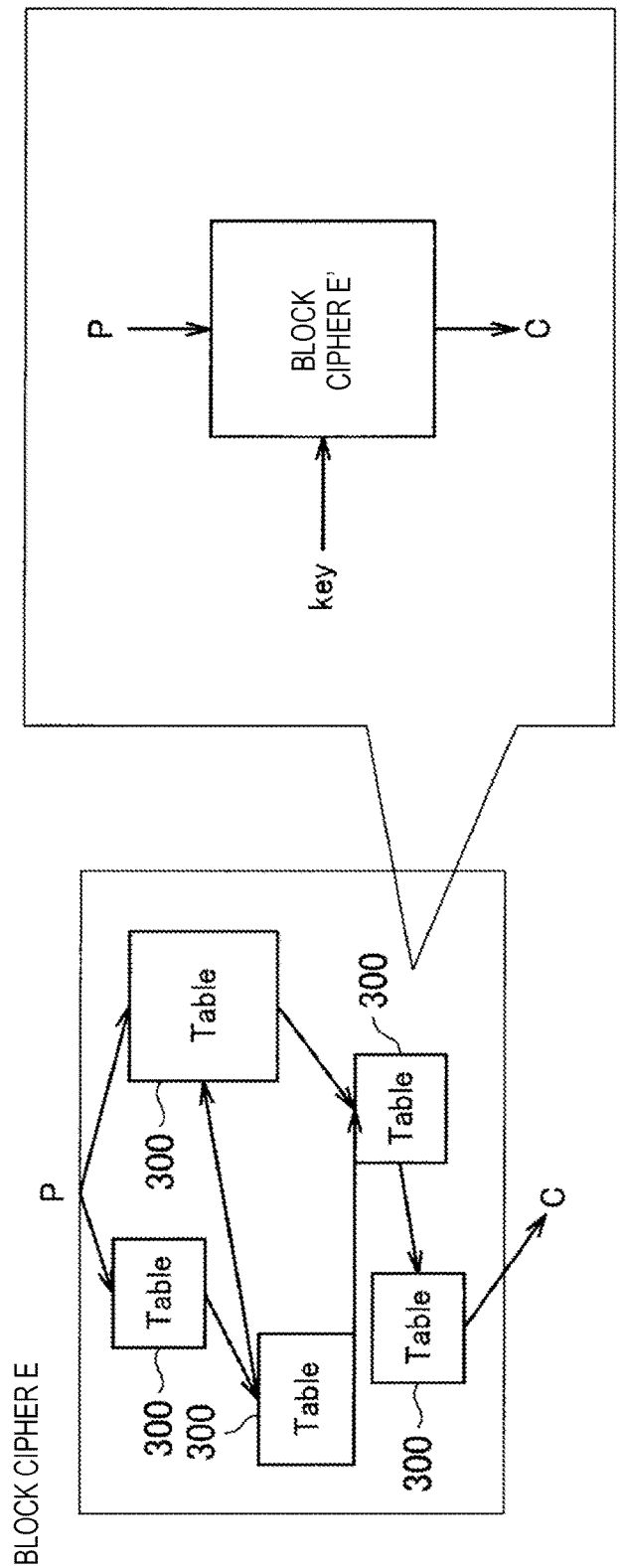
FIG. 7 is a schematic diagram illustrating an overview of an encryption technique according to the present embodiment.

FIG. 7 is a schematic diagram illustrating the overview of an encryption technique according to the present embodiment, and illustrates an encryption device according to a basic configuration example (A). A block cipher E includes a plurality of tables 300, and each table is configured as a secure block cipher E' (internal block cipher) in the black box model. This allows the secure block cipher E to be configured. A part or all of components including the block cipher E' are tabulated and implemented in the white box implementation. A user can freely choose an algorithm of the block cipher E'. Additionally, the encryption device can include a central processing unit such as a CPU, and a program for causing the central processing unit to function. In this case, the program can be stored in a recording medium such as memory installed on the encryption device. A table included in a block cipher can be stored in the recording medium installed on the encryption device.

In this way, the block cipher E, which is secure in the white box model, is configured by using the block cipher E', which is secure in the black box model, as a component in the basic configuration example (A) of the present embodiment. A user can freely choose an algorithm of the internal block cipher E', and receive it as an input. In the white box implementation, functions based on the internal block cipher E' are dependent on a key, and a part or all of the functions are implemented as a table. In other words, the internal block cipher E' is generated and tabulated by the expanded key K' output from the key schedule unit 100. Tabulation can greatly enhance the confidentiality of the key as compared with each encryption operation.

As a specific example (B) of the configuration example (A), the block cipher E has a Feistel structure and includes an F function having a single type of input and output size, and the F function is generated on the basis of the internal block cipher E'. The F function can be obtained as a transformation of the internal block cipher E' by fixing a part of the input of the E' and disregarding a part of the output of the E'. All of the F functions are implemented as a table in the white box implementation.

As a specific example (C) of the configuration example (A), the block cipher E has an SPN structure and includes an S function having a single input and output size, and the S function is generated on the basis of the internal block cipher E'. The S function includes internal block ciphers having the same size. All of the S functions are implemented as a table in the white box implementation.

As a specific example (D) of the configuration example (A), the block cipher E has an extended Feistel structure and includes an F function having a multiple types of input and output size, and the F function is generated on the basis of the internal block cipher E'. The F function can be generated by fixing a part of the input of the internal block cipher and disregarding a part of the output of the internal block cipher. A part or all of the F functions are implemented as a table in the white box implementation.

As a specific example (E) of the configuration example (A), the block cipher E has an SPN structure and includes an S function having multiple types of input and output size, and the S function is generated on the basis of the internal block cipher E'. The S function includes internal block ciphers having the same size. A part or all of them are implemented as a table in the white box implementation.

FIG. 8 is a schematic diagram illustrating an overall configuration, a type of F function/S function, and possibility of change in a table size for specific examples (B), (C), (D), and (E).

Figure 9:
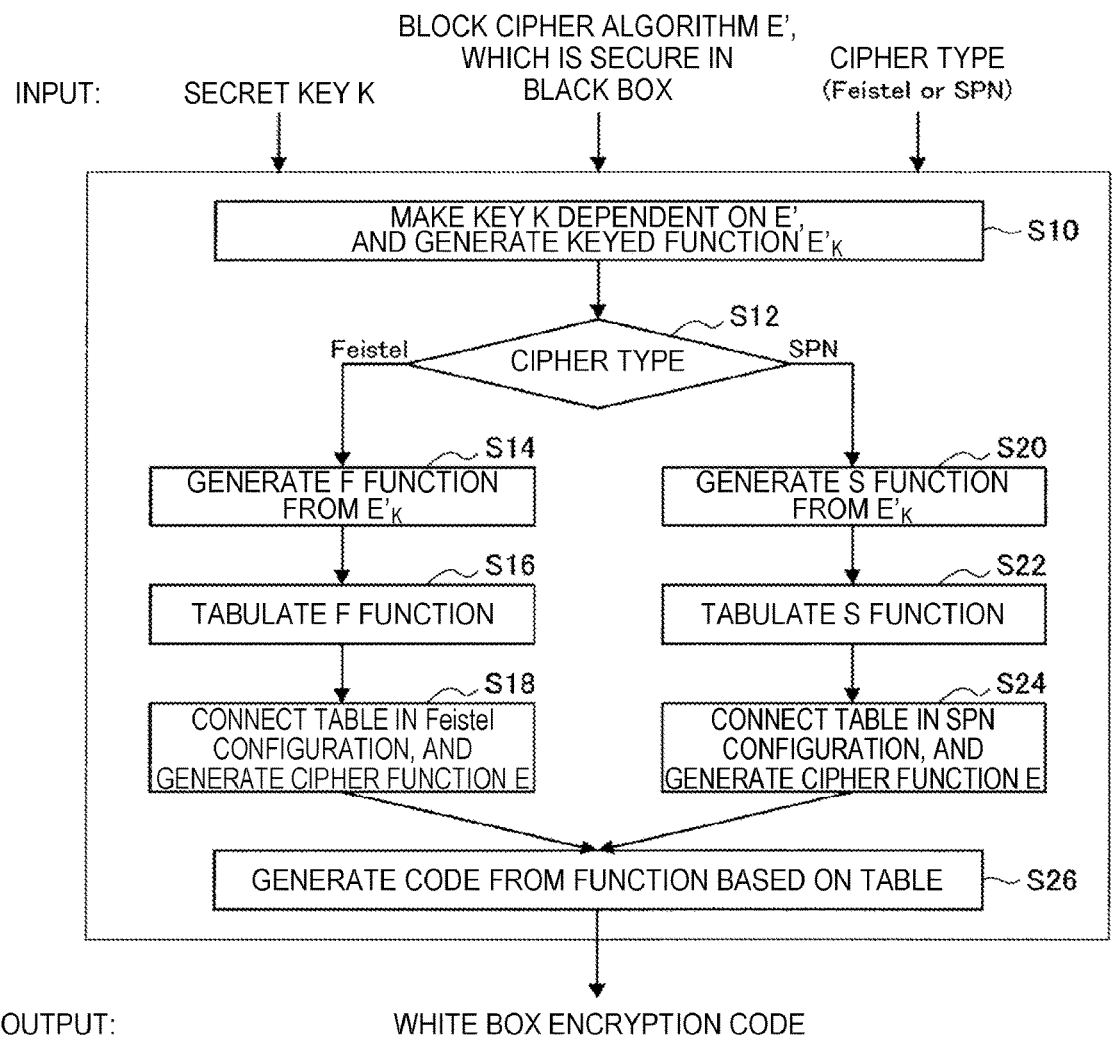
FIG. 9 is a flowchart illustrating processing according to a cipher type.

FIG. 9 is a flowchart illustrating processing according to a cipher type. First, in step S10 of FIG. 9, the key K is made dependent on the internal block cipher E' to generate a keyed function $E'_K$. Next, in step S12, a cipher type is determined, and if the cipher type is determined as a Feistel structure, the processing proceeds to step S14. In step S14, an F function is generated from $E'_K$. Next, in step S16, the F function is tabulated. In step S18, the table is connected in the Feistel configuration to generate a cipher function E.

If the cipher type is determined as an SPN structure in step S12, the processing proceeds to step S20 and an S function is generated from $E'_K$. Next, in step S22, the S function is tabulated. In step S24, the table is connected in the SPN configuration to generate a cipher function E. The processing proceeds to step S26 after steps S18 and S24, and a code is then generated from a function based on the table. This generates a white box encryption code.

3. Specific Configuration Examples

The following describes the configuration examples of the specific example (B), the specific example (C), the specific example (D) and the specific example (E), and advantageous effects thereof in detail. The internal block cipher E' is an n'-bit block cipher, and secure in the black box model.

3.1. Specific Example (B)

Figure 10:
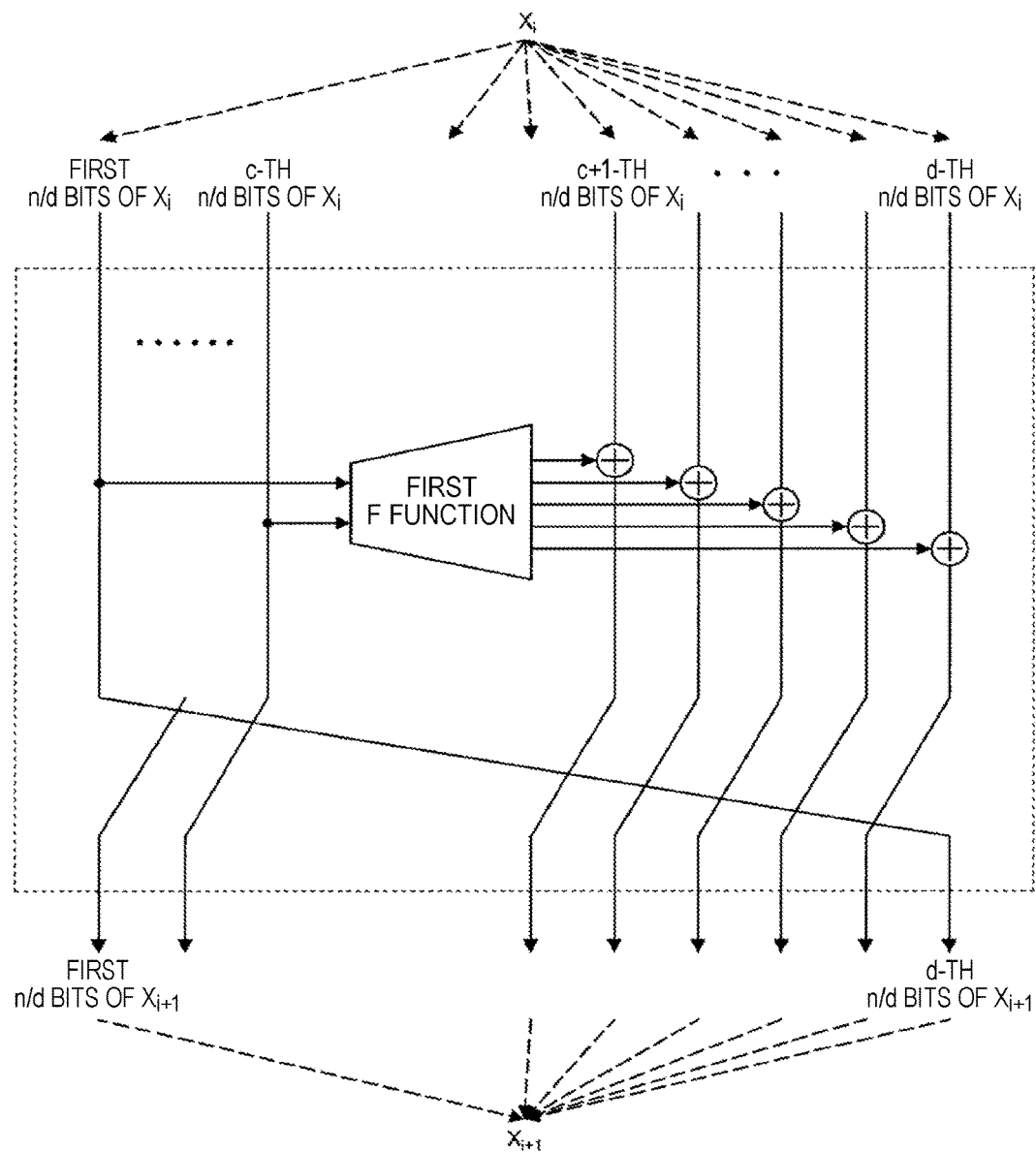
FIG. 10 is a schematic diagram illustrating the specific example (B)

FIG. 10 is a schematic diagram illustrating the specific example (B), and illustrates a configuration example of the generalized Feistel structure. Input data Xi of n bits are divided into n pieces of data, and the data of each line have a size of n/d bits in the example illustrated in FIG. 10. The F function has a c×n/d-bit input and a (d−c)×(n/d)(=n−(c×n/d))-[bit] output. Data of c lines are input into the F function, while the output is divided into d−c pieces of n/d-[bit] data, and exclusive-ORed with each of the remaining d−c lines. The F function is configured on the basis of the internal block cipher E'. It is herein considered that a block size n' of E' satisfies n'>(d−c)×(n/d) and n'>c×(n/d) (condition 1). As illustrated in FIG. 10, the value of a bit input into the block cipher E' is output as a lower bit than the value of a bit obtained on the basis of the exclusive OR.

Figure 11:
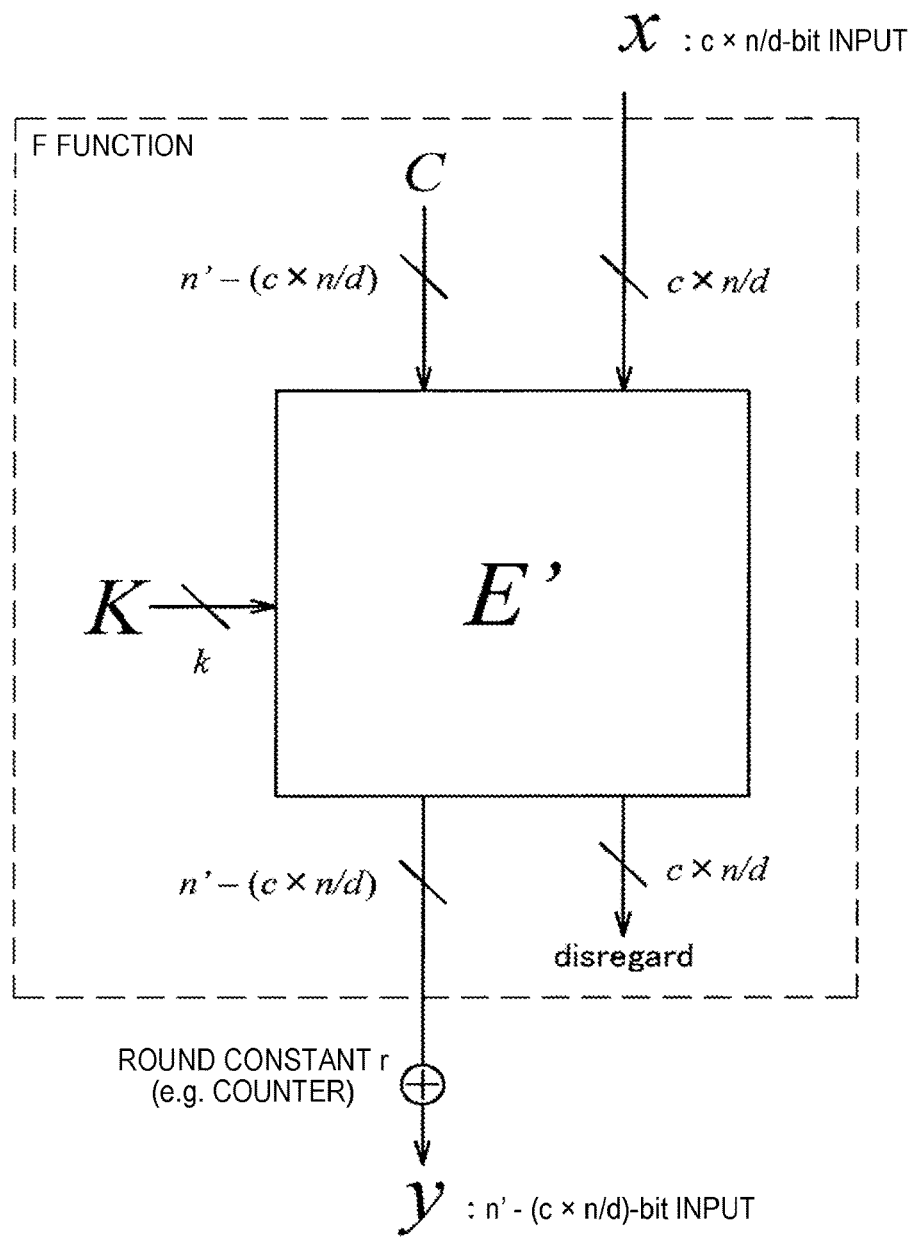
FIG. 11 is a schematic diagram illustrating a configuration of an F function.

FIG. 11 is a schematic diagram illustrating a configuration of an F function. The following is a method for configuring the F function with a c×n/d-[bit] input and a (d−c)×(n/d)-[bit] output on the basis of the internal block cipher E' of n' bits. First, as illustrated in FIG. 11, given n'−(c×n/d) [bits] among the input of n' [bits] into the internal block cipher E' are fixed as a constant value (e.g. all 0), and the input size is set as c×n/d. Next, the output size is set as n'−(c×n/d) by disregarding given (c×n/d) [bits] of the output. In this way, a part of the input bits into the internal block cipher E' is fixed, and a part of the output is disregarded, thereby configuring the F function on the basis of a given internal block cipher E' satisfying the condition 1. The F function is configured by tabulation on the basis of the table corresponding to an input and output of n' bits. For example, when an input and output are 8 bits, a table is generated that associates the output value with the input value (0 to 255). It is possible on this table to adjust the number of input and output bits such as an 8-bit input and a 120-bit output by fixing a part of the input bits and disregarding a part of the output. Herein, a round-unique constant is exclusive-ORed (XORed) with an output of n'−(c×n/d) bits in order to change the F function in each round. For example, the round-unique constant is referred to as round number, and the round number is XORed. When the round number is 4, 4 is XORed. However, this exclusive OR is operated after table lookup, and thus this operation itself is not included in the table. This makes it possible to express an F function that is different in each round by use of a single type of F function table. Accordingly, the F functions in the respective round functions can be configured in common, and memory space for storing the table can be greatly reduced.

Figure 12:
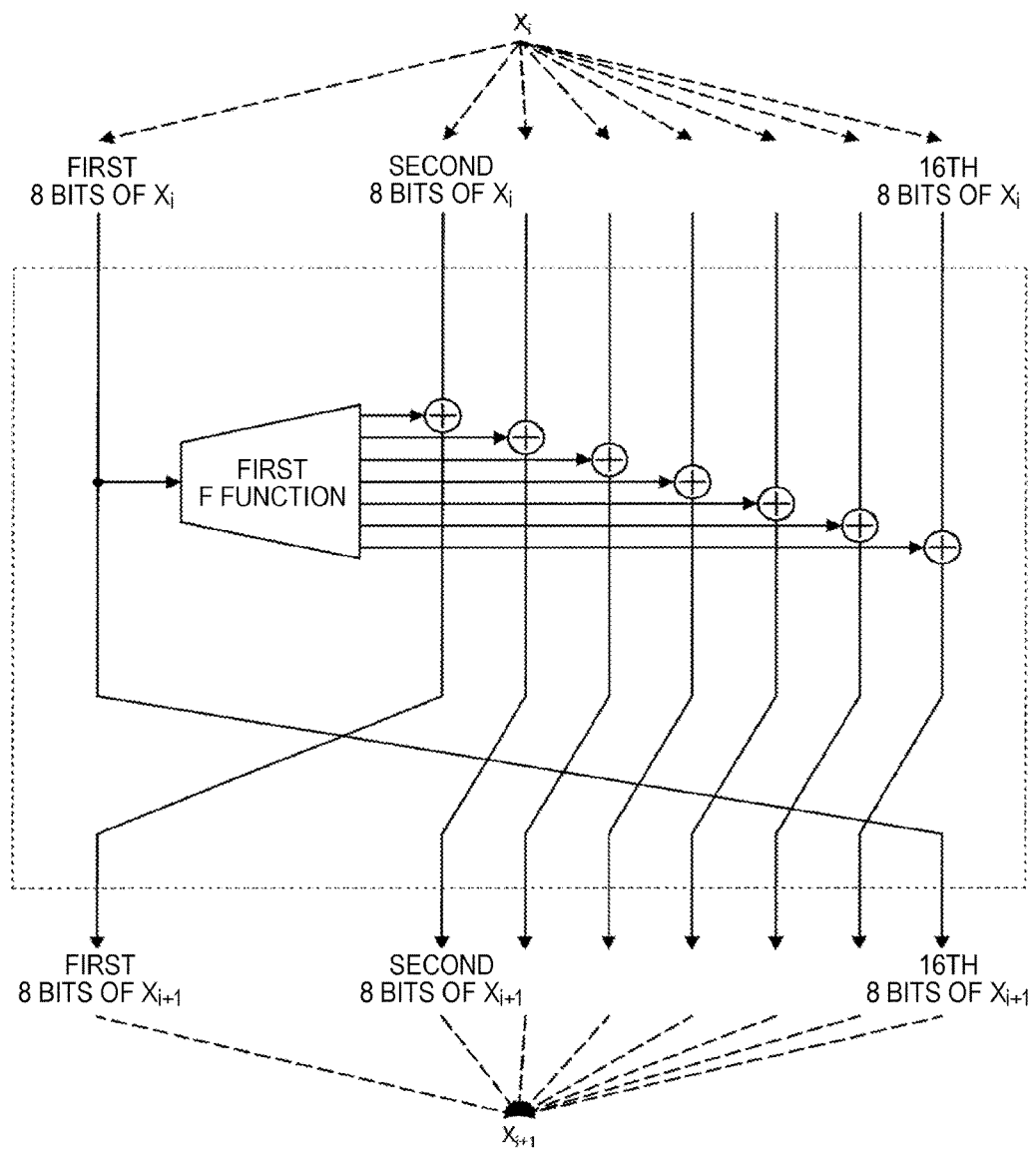
FIG. 12 is a schematic diagram illustrating an overall configuration for $n=n'=128$, $c=1$, and $d=16$ in FIG. 10.
Figure 13:
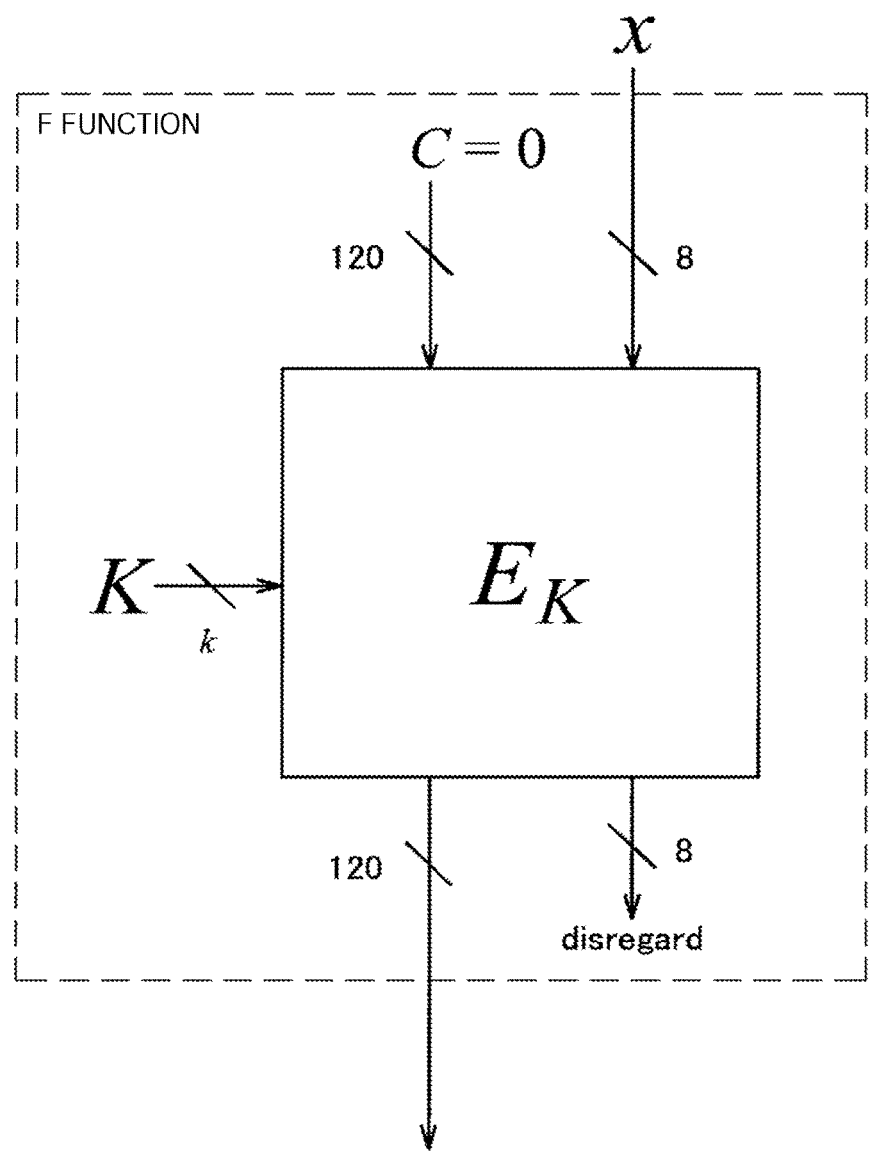
FIG. 13 illustrates a configuration of an F function in an example of FIG. 12.
Figure 15:
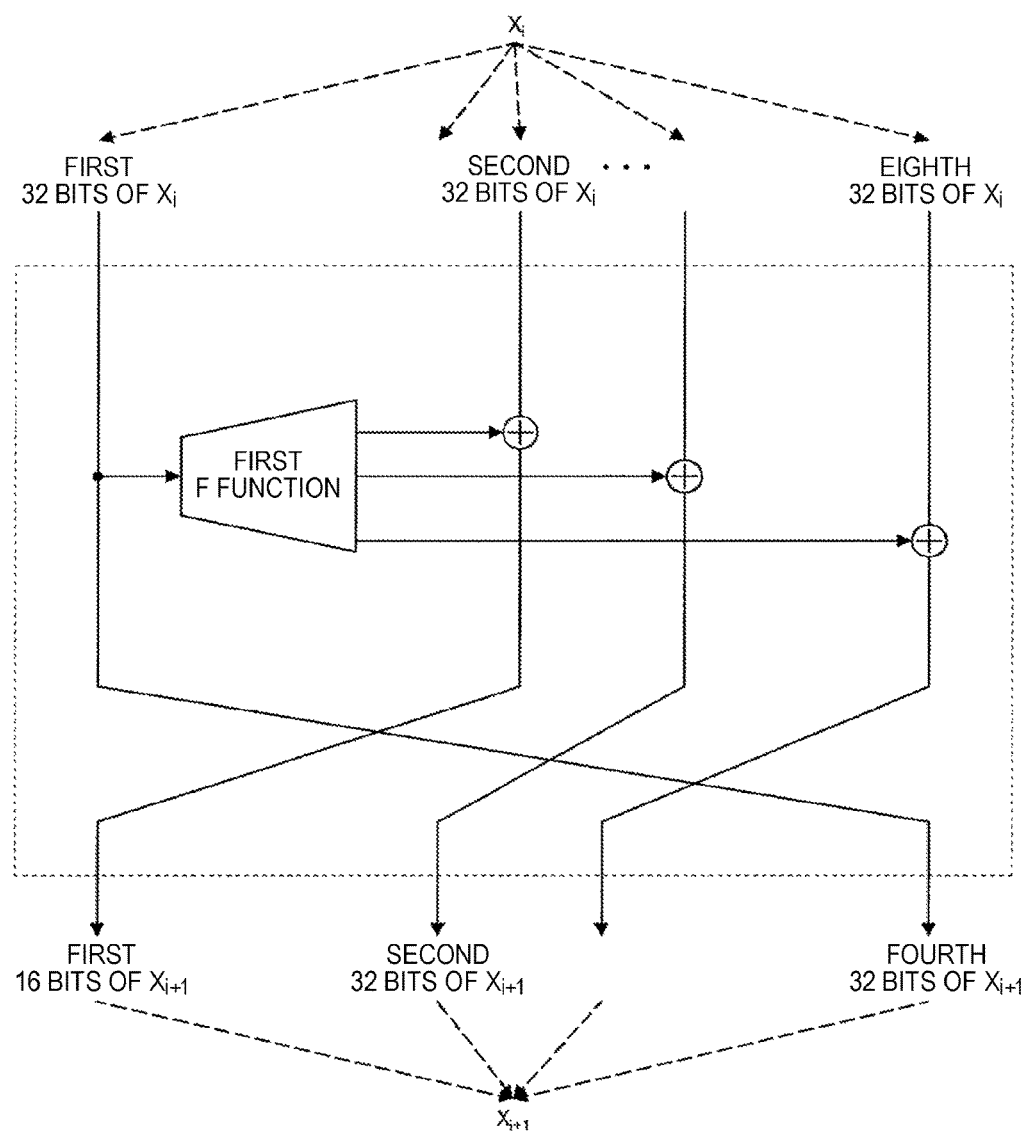
FIG. 15 is a schematic diagram illustrating an overall configuration for $n=128$, $c=1$, and $d=4$ in FIG. 10.
Figure 16:
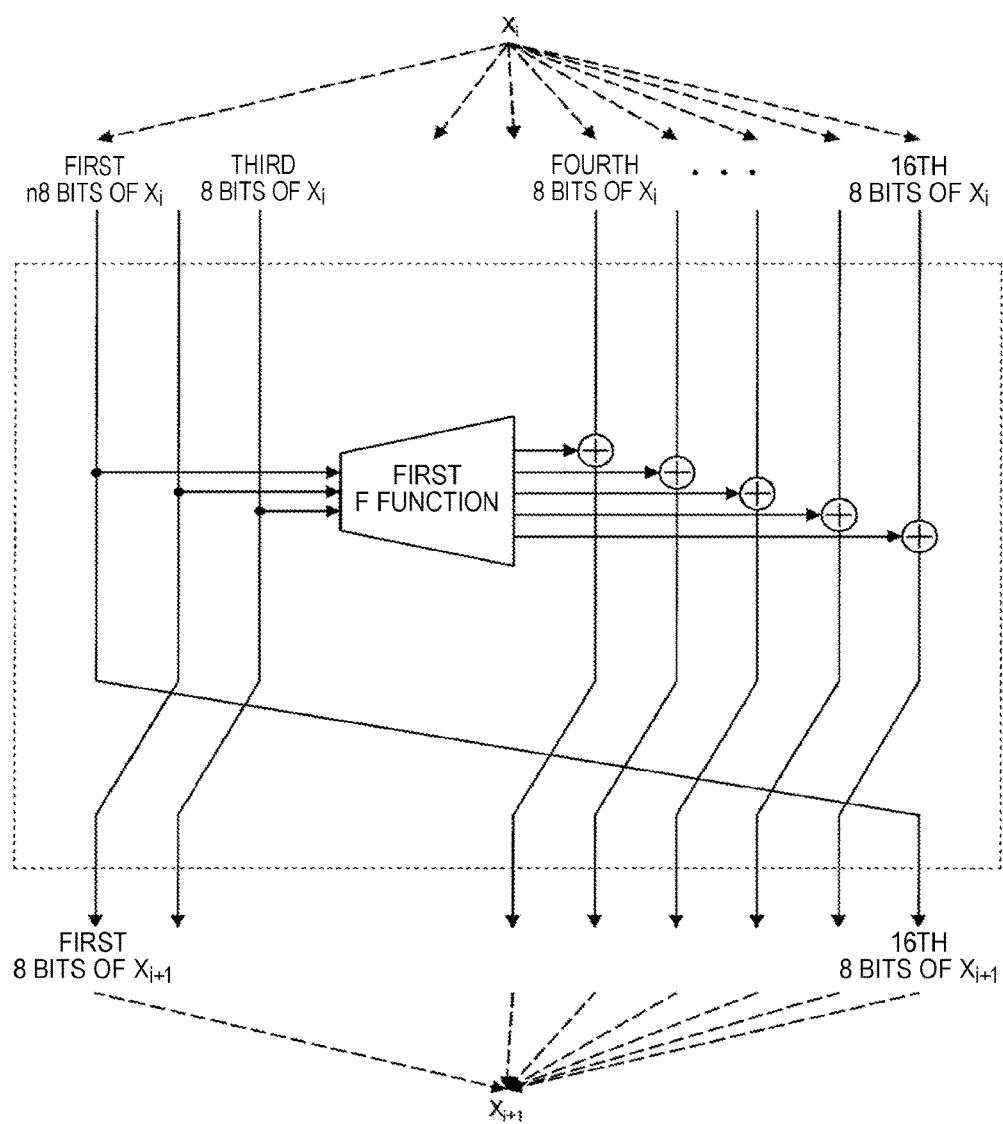
FIG. 16 is a schematic diagram illustrating an overall configuration for $n=128$, $c=3$, and $d=16$ in FIG. 10.

FIGS. 12 to 15 are schematic diagrams each illustrating a specific configuration example. FIG. 12 illustrates an overall configuration for n=n'=128, c=1, and d=16. FIG. 13 illustrates the configuration of the F function in the example of FIG. 12. Meanwhile, FIG. 14 illustrates an overall configuration for n=128, c=1 and d=8, FIG. 15 illustrates an overall configuration for n=128, c=1 and d=4, and FIG. 16 illustrates an overall configuration for n=128, c=3 and d=16.

FIG. 17 is a schematic diagram illustrating an example in which there are two F functions in a single round, and n is equal to 128 and d is equal to 4. In all the examples described above, an F function is implemented as a table in the white box implementation. In the examples of FIGS. 12, 14, 15, and 16, the tables have sizes (sizes of the F functions) of approximately 3.84 [bytes], 918 [Kbytes], 51.5 [Gbytes], and 218 [Mbytes], respectively.

3.2. Specific Example (C)

Figure 18:
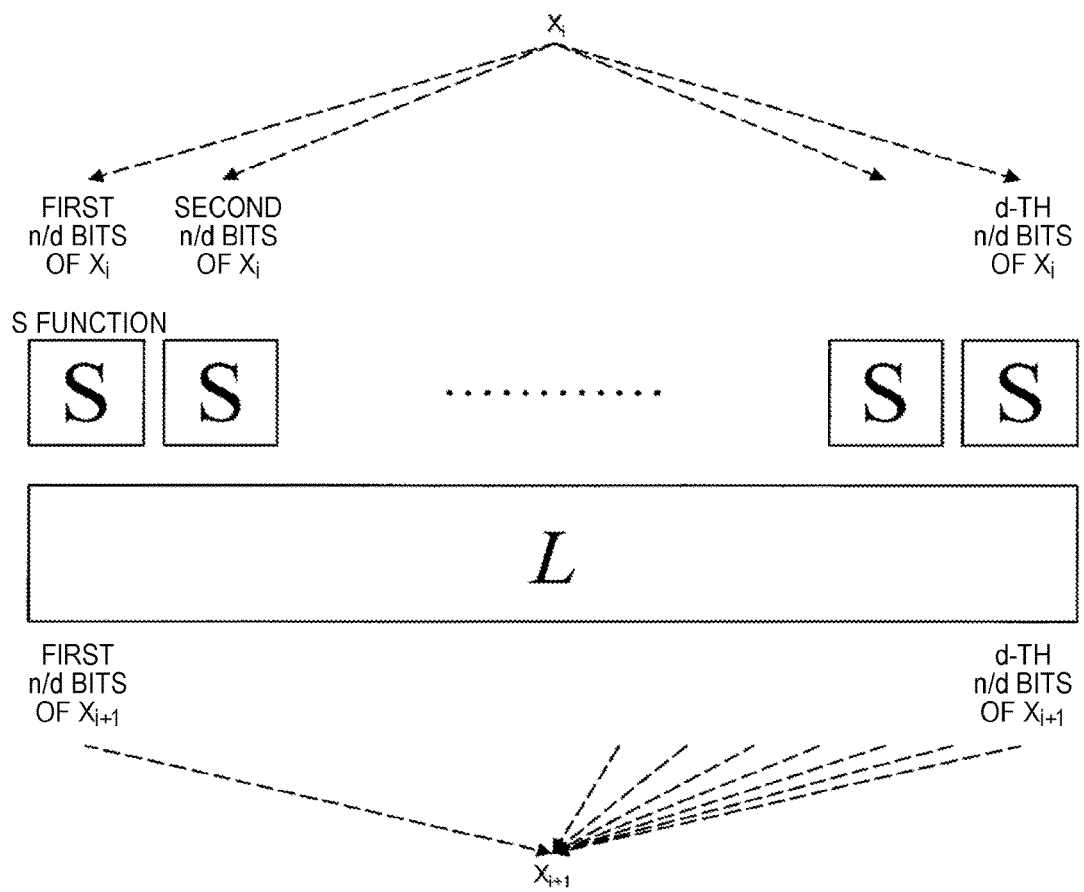
FIG. 18 is a schematic diagram illustrating the specific example (C)

FIG. 18 is a schematic diagram illustrating the specific example (C), and illustrates a configuration example based on the SPN structure. Input data Xi of n bits are divided into n pieces of data, and the data of each line have a size of n/d [bits] in the example illustrated in FIG. 18. An operation (non-linear transformation operation substitution-layer (S layer)) of the S function having an input and output of n/d [bits] is executed on each of data. Afterwards, n-bit input and output linear transformation is executed as an operation of an L function (linear transformation permutation-layer (P layer)). Herein, the S function and the L function (input and output linear transformation L) are bijective functions, and the L function includes a round constant operation. The S function is configured on the basis of the internal block cipher E', but the S function has to be a bijective function. As illustrated in FIG. 11, it is not possible to configure the S function through transformation by fixing the input bits of the internal block cipher E', and disregarding a part of the outputs. Accordingly, a block cipher of n/d [bits] has to be used. Accordingly, the condition of the block size n' of the internal block cipher E' is n'=n/d (condition 2).

Figure 19:
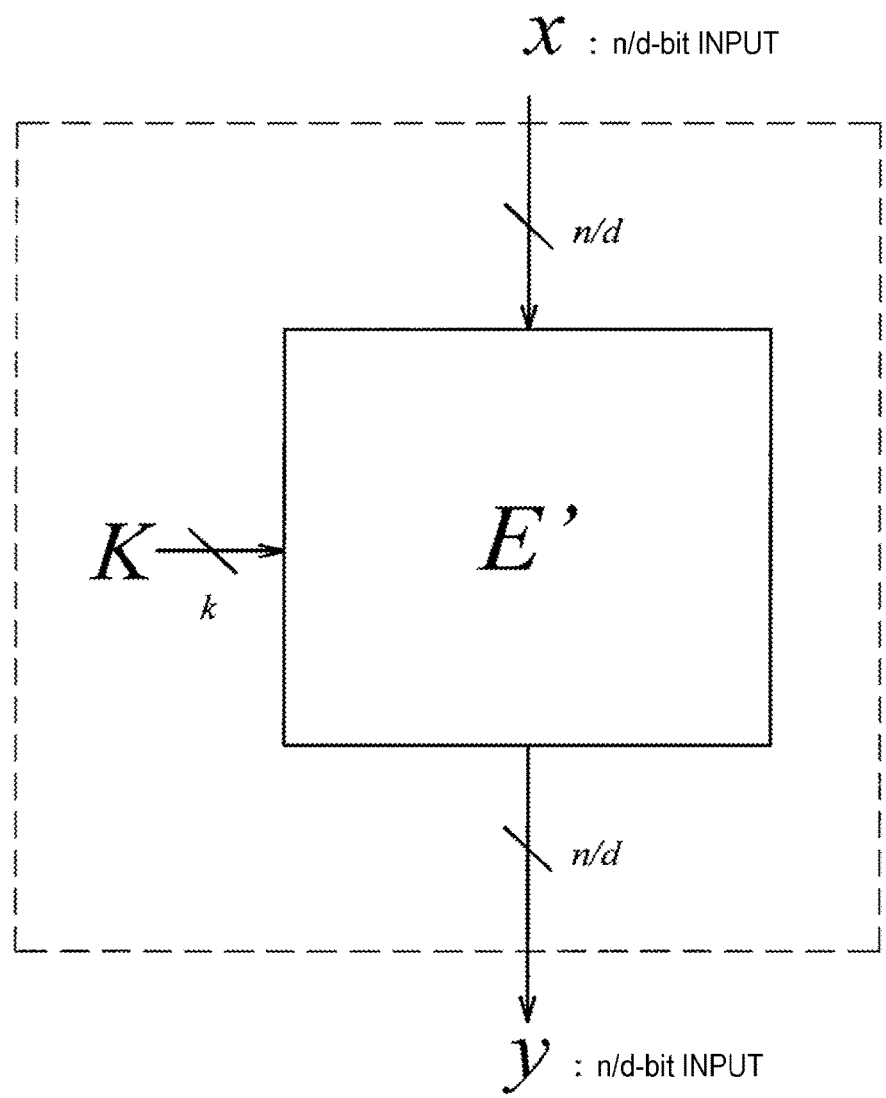
FIG. 19 is a schematic diagram illustrating a configuration of an S function illustrated in FIG. 18.

FIG. 19 is a schematic diagram illustrating a configuration of an S function illustrated in FIG. 18. As illustrated in FIG. 19, the internal block cipher E' included in an S function has both input and output sizes of n/d [bits]. Accordingly, for example, when an input and output are 8 bits, a table is generated that associates the output value with the input value (0 to 255), and an operation of the S function is conducted on the basis of the table. An L function for a linear transformation operation includes, for example, a square matrix. When the input and output of the S function are 8 bits, the output of 8 bits from the S function is input into the L function. The value of 8 bits is output from the L function by multiplying the value of 8 bits by a square matrix of 8×8. In this way, the L function serves to diffuse the output value from the S function.

Figure 20:
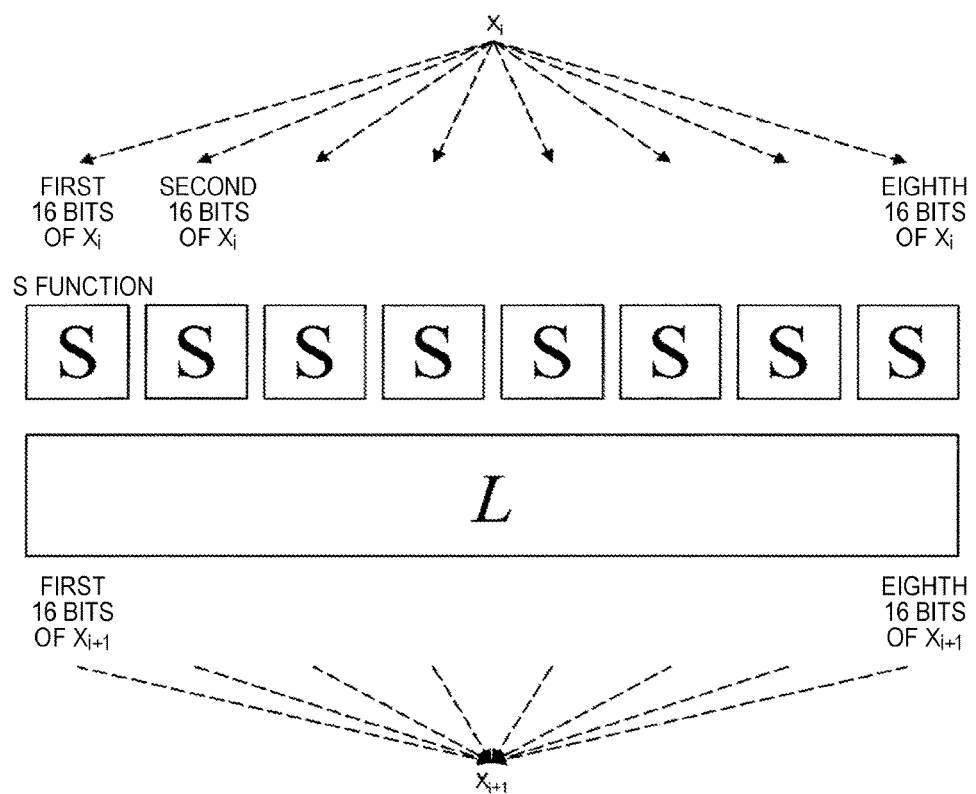
FIG. 20 is a schematic diagram illustrating $n=128$ and $d=8$ in FIG. 18.

FIG. 20 is a schematic diagram illustrating a specific configuration example for n=128, and d=8. An S function is implemented as a table in the white box implementation. The table of FIG. 20 has a size of approximately 256 [bytes]. Similarly to the F function illustrated in FIG. 11, a round-unique constant can be XORed with the output of each S function in order to change the S function. This leads to common S functions, and memory space for storing the table can be thus reduced greatly.

3.3. Specific Example (D)

Figure 21:
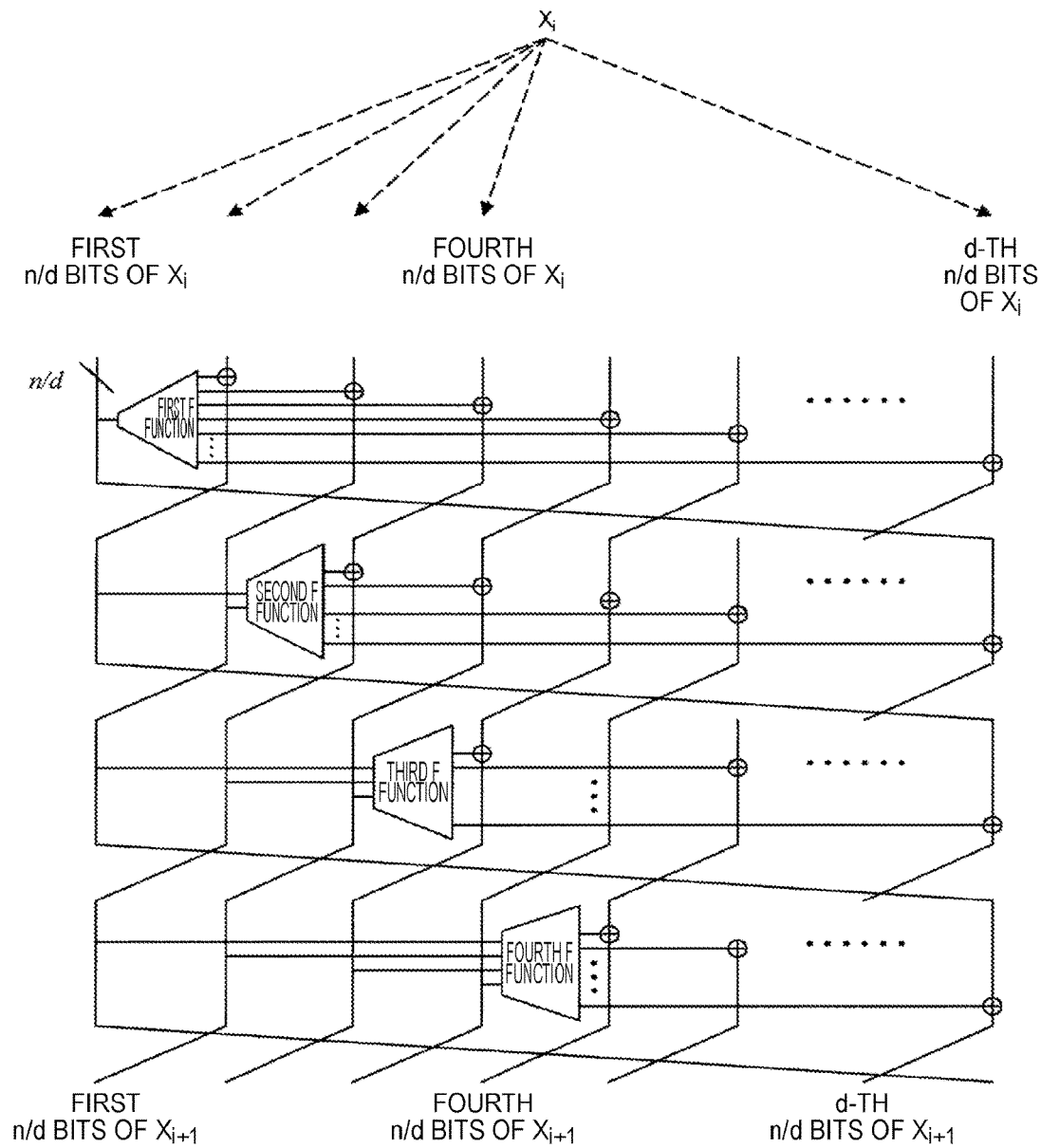
FIG. 21 is a schematic diagram illustrating the specific example (D)

FIG. 21 is a schematic diagram illustrating the specific example (D), and illustrates a configuration example of the modified Feistel structure. Input data of n bits are divided into d pieces of data, and the data of each line have a size of n/d in the example illustrated in FIG. 21, and F functions of four types that have different sizes are included. An F function having an n/d-[bit] input, and a (n−n/d)-[bit] output is used in the first round. An F function having a 2n/d-[bit] input, and a (n−2n/d)-[bit] output is used in the second round. An F function having a 3n/d-[bit] input, and a (n−3n/d)-[bit] output is used in the third round. An F function having a 4n/d-[bit] input, and a (n−4n/d)-[bit] output is used in the fourth round. These four rounds serve as a unit, and the processing is repeated by given rounds. As in the method illustrated in FIG. 11, an F function having a given size is generated from the internal block cipher E', and the round constant is XORed with the output. In the white box implementation, a part or all of them are implemented as a table in accordance with a code (table size) requested by a user. When n is equal to 128 and d is equal to 16, the F functions of the first, second, third, and fourth rounds have table sizes of approximately 3.84 [bytes], 918 [Kbytes], 218 [Mbytes], and 51.5 [Gbytes], respectively. It is possible to adjust the overall code size by choosing which F function is implemented as a table in accordance with a request of a user. For example, if the fourth round function is not tabulated, but a function operation is conducted each time, it is possible to reduce the overall code size.

3.4. Specific Example (E)

Figure 22:
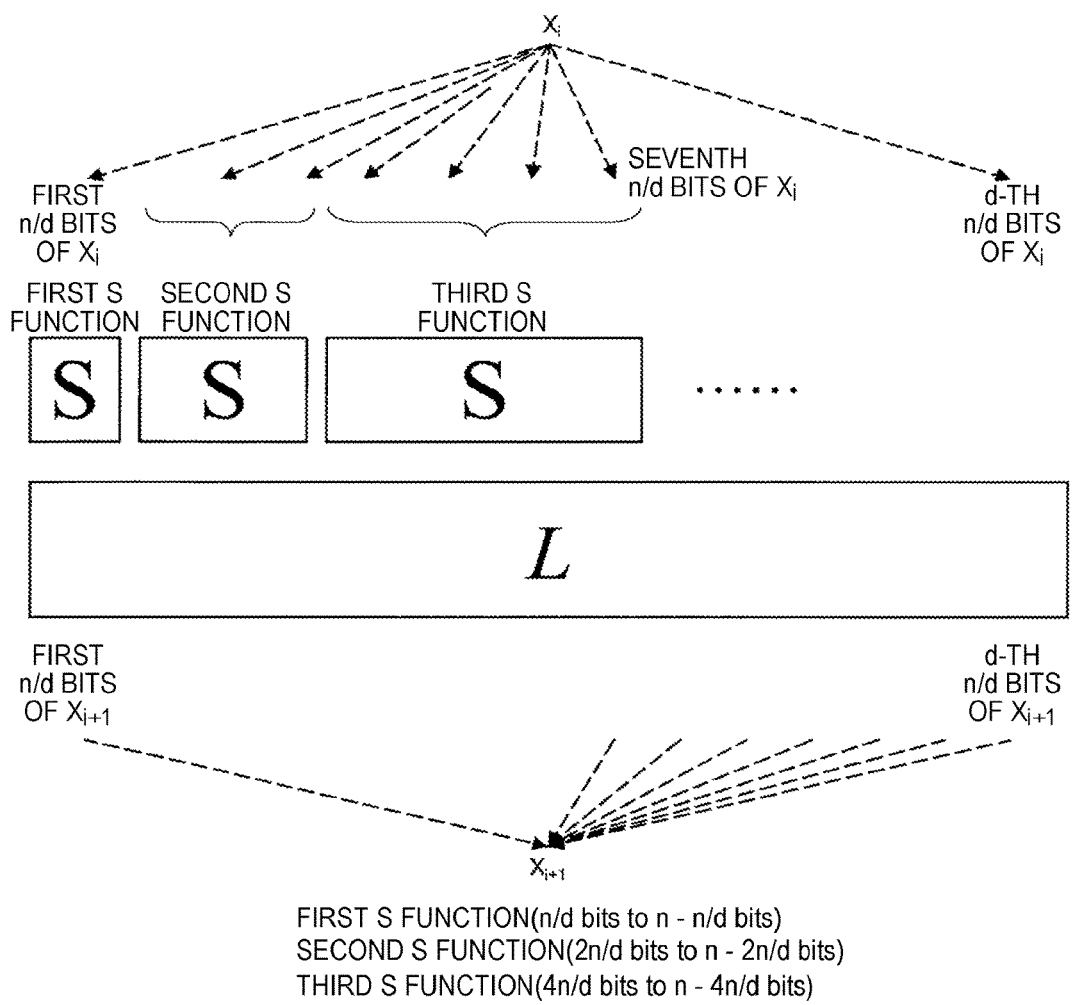
FIG. 22 is a schematic diagram illustrating the specific example (E)

FIG. 22 is a schematic diagram illustrating the specific example (E), and illustrates a configuration example based on the modified SPN structure. Input data of n bits are divided into d pieces of data, and the data of each line have a size of n/d in the example illustrated in FIG. 22, and S functions of three types that have different sizes are included. As the S layer of each round, S functions having an input and output of n/d [bits], an input and output of 2n/d [bits], and an input and output of 4n/d [bits] are used. In the white box implementation, a part or all of them are implemented as a table in accordance with a code (table size) requested by a user. For example, it is considered that n is equal to 128 and d is equal to 8, and data of 8 [bits], 16 [bits] and 32 [bits] are implemented. The respective tables have sizes of 256 [bytes], 132 [Kbytes], and 17.2 [Gbytes]. It is possible to adjust the overall code size by choosing which S function is implemented as a table in accordance with a request of a user.

According to the present embodiment, the security of key extraction in the white box model results in the security of the key recovery problem in the black box model of the internal block cipher E'. This results from the internal block cipher E' implemented as a table in the white box implementation. An attacker can also access only an input and output of the table in the white model. This matches with the black box model of the internal block cipher E'. It is possible to preserve the same security level as that of key recovery of the black box model of the internal block cipher E' even in the white box model by applying a reliable cipher (such as AES) to the internal state (internal block cipher E').

Unless an attacker knows the key, the attacker is incapable of reducing the table size (Space-hardness). Unless an attacker knows information on the key of the internal block cipher E', the attacker is incapable of computing E' except for a table operation. Accordingly, it is not possible to reduce the size of the provided table into a smaller one. This means that an attacker has to use massive data to carry out a code lifting attack. The time necessary for code extraction increases in proportion to the data size. Code lifting then takes much time. Furthermore, even if the entire code is acquired, it is not possible to compress the size and massive data have to be transmitted to deliver the code. It is thus still possible to reduce the risk of delivery.

As for external encoding, it is possible to ensure security even without External Encoding.

It is further possible to configure tables having a variety of sizes according to implementation requests. According to the specific examples (B) and (C), it is possible to configure an algorithm having a given table size by changing the value of the number d of divided data. According to the specific examples (D) and (E), it is possible to implement a plurality of table sizes for the same algorithm by appropriately choosing the values of the number d of divided data or the sizes of an F function and an S function to be used.

A user can freely choose an internal block cipher E'. It is possible to freely choose an internal block cipher E' as long as the internal block cipher E' satisfies the conditions (conditions 1 and 2) of the input and output sizes. When used in a black box, a table does not have to be implemented, but an internal operation can be directly operated. In this case, it is possible to satisfy a variety of implementation needs by appropriately choosing an internal block cipher E'. For example, when AES is used as an internal block cipher E' and AES-NI is used, very speedy implementation by software is possible and secure implementation against a cash timing attack is possible. The use of light ciphers Piccolo and Pride by software makes implementation possible even in environments of considerable constraints such as a RAM size.

4. Configuration Example for Decryption

As discussed above, the decryption algorithm D corresponding to the encryption algorithm E can be defined as an inverse function $E^{-1}$ of the encryption algorithm E, and receives the ciphertext C and the key K as an input and outputs the plaintext P. As for the decryption algorithm D, it is possible to preserve the same security level as that of the black box model by configuring a table in the black box implementation.

5. Differences from Related Art

The following describes differences between the technique according to the present embodiment, and the methods (referred to as Related Art 1) described in S. Chow, P. Eisen, H. Johnson, P. C. van Oorschot "A white-box DES implementation for DRM applications." DRM 2002 and S. Chow, P. Eisen, H. Johnson, P. C. van Oorschot "White-Box Cryptography and an AES Implementation?" SAC 2002 and the method described in A. Biryukov, C. Bouillaguet, D. Khovratovich: "Cryptographic Schemes Based on the ASASA Structure: Black-Box, White-Box, and Public-Key", ASIACRYPT 2014 (referred to as Related Art 3).

5.1. Difference from Related Art 1

Related Art 1 is a method for implementing algorithms such as the existing AES and DES, but is not an encryption technique for a white box. It has already been demonstrated that Related Art 1 is not secure for the white box model. Accordingly, Related Art 1 is different from the technique according to the present embodiment, which greatly improves the security in the white box model.

5.2. Difference from Related Art 2

Related Art 2 does not allow for free choice of an internal block cipher E', and the internal block cipher E' is limited to the ASASA structure, which is decided in advance. The present embodiment demonstrates that even a block cipher, which is secure in the black box model, satisfies security, and it is possible to freely choose an internal block cipher E' as long as the internal block cipher E' satisfies the conditions (conditions 1 and 2) of the input and output sizes.

This makes it possible to freely choose an internal block cipher E' in the black box implementation in accordance with implementation environments and the requested security. For example, when AES is used as an internal block cipher E' and AES-NI is used, very speedy implementation by software is possible and secure implementation against a cash timing attack is possible. The use of light ciphers Piccolo and Pride by software makes implementation possible even in environments of considerable constraints such as a RAM size. Although the ASASA structure is not secure in the white box model, the method according to the present embodiment can ensure the security for the white box model.

6. Security Achieved by Encryption according to the Present Embodiment

Figure 23:
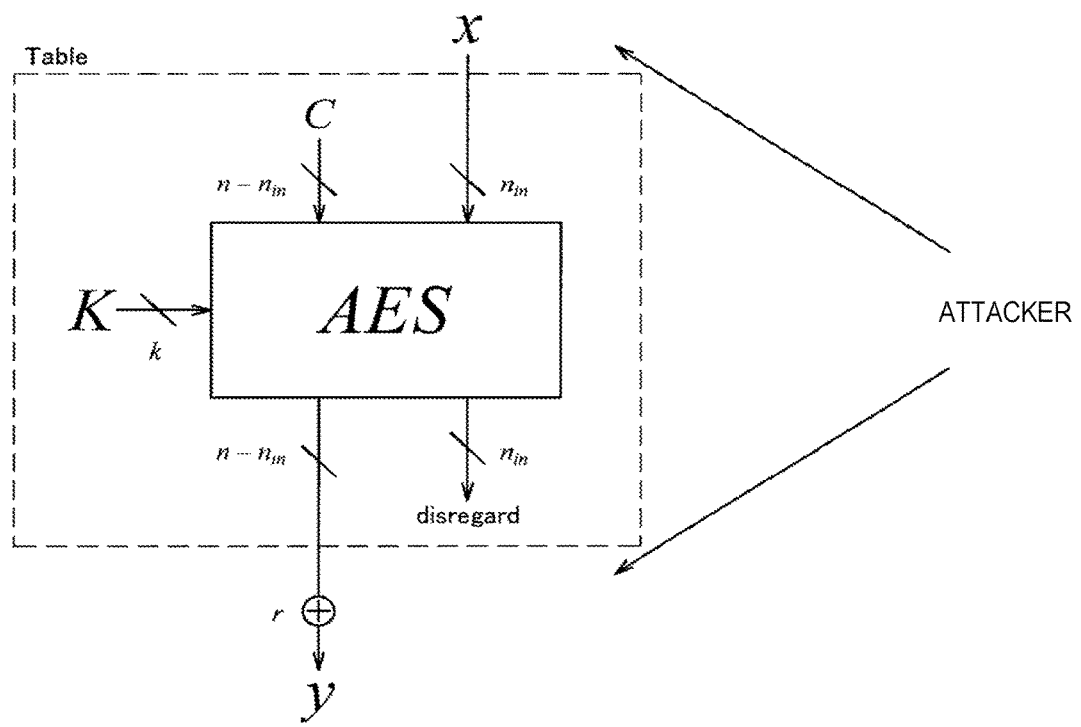
FIG. 23 is a schematic diagram for describing security achieved by encryption according to the present embodiment.

FIG. 23 is a schematic diagram for describing the security achieved by the encryption according to the present embodiment, and illustrates an example in which the F function having a Feistel structure illustrated in FIG. 11 is configured by AES. As discussed above, an attacker can access an input and output of a table in the white box model. The problem that the key is obtained from the table having the same configuration as that of the black box model of the internal block cipher E' (white box model) results in the same security level as that of the AES key recovery attack (black box model). The encryption according to the present embodiment thus makes it possible to preserve the same security level as that of the AES key recovery attack (black box model). The security in the white box model results in the security of the key recovery problem in the black box model of the internal block cipher E'. Unless an attacker knows the key, the attacker is incapable of reducing the table size (Space-hardness).

Figure 24:
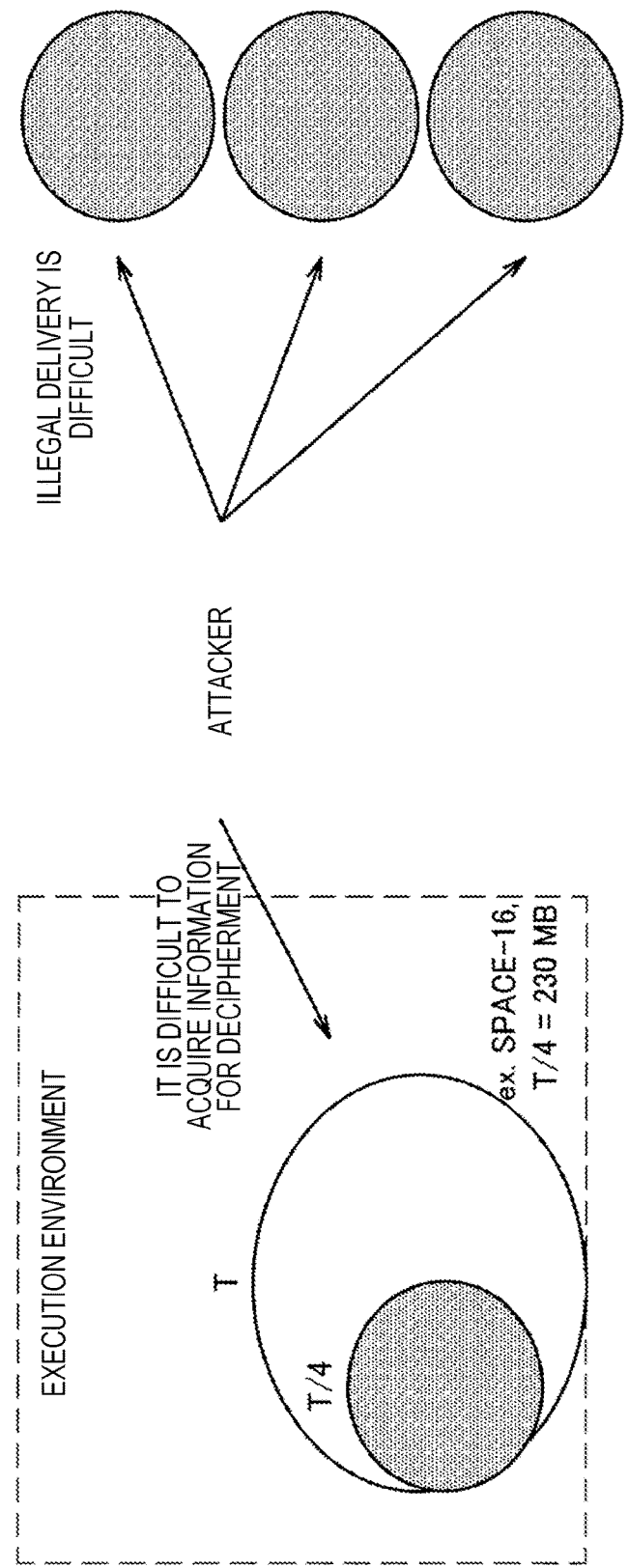
FIG. 24 is a schematic diagram for describing security achieved by encryption according to the present embodiment.

FIG. 24 is a schematic diagram for describing the security achieved by the encryption according to the present embodiment, and illustrates the amount of data that is necessary for an attacker to carry out an attack. The extremely large amount of data has to be obtained to acquire the secret key K for an attack. Specifically, $10^{4.4}$ to $10^{10.5}$ times as large the amount of data as that for a 128-bit key is necessary. Even if an attacker obtains the data, the attacker is incapable of compressing the data. Massive data serve as a deterrent to illegal delivery.

According to the present embodiment, it is possible to configure tables having a variety of sizes according to implementation requests. In the configurations of the specific examples (B) and (C), it is possible to configure an algorithm having a given table size by changing the value of the number d of divided data. In the configurations of the specific examples (D) and (E), it is possible to implement a plurality of table sizes for the same algorithm by appropriately choosing the values of the number d of divided data or the sizes of an F function and an S function to be used. Furthermore, a user can freely choose an internal operation of a table, and choose the most appropriate internal operation for the black box implementation.

7. Example of Application to which the Present Embodiment is Applied

The technique according to the present embodiment can not only preserve the confidentiality of data through the communication channel as illustrated in FIG. 1, but also be applied to a variety of applications. The following describes some examples of the applications.

Figure 25:
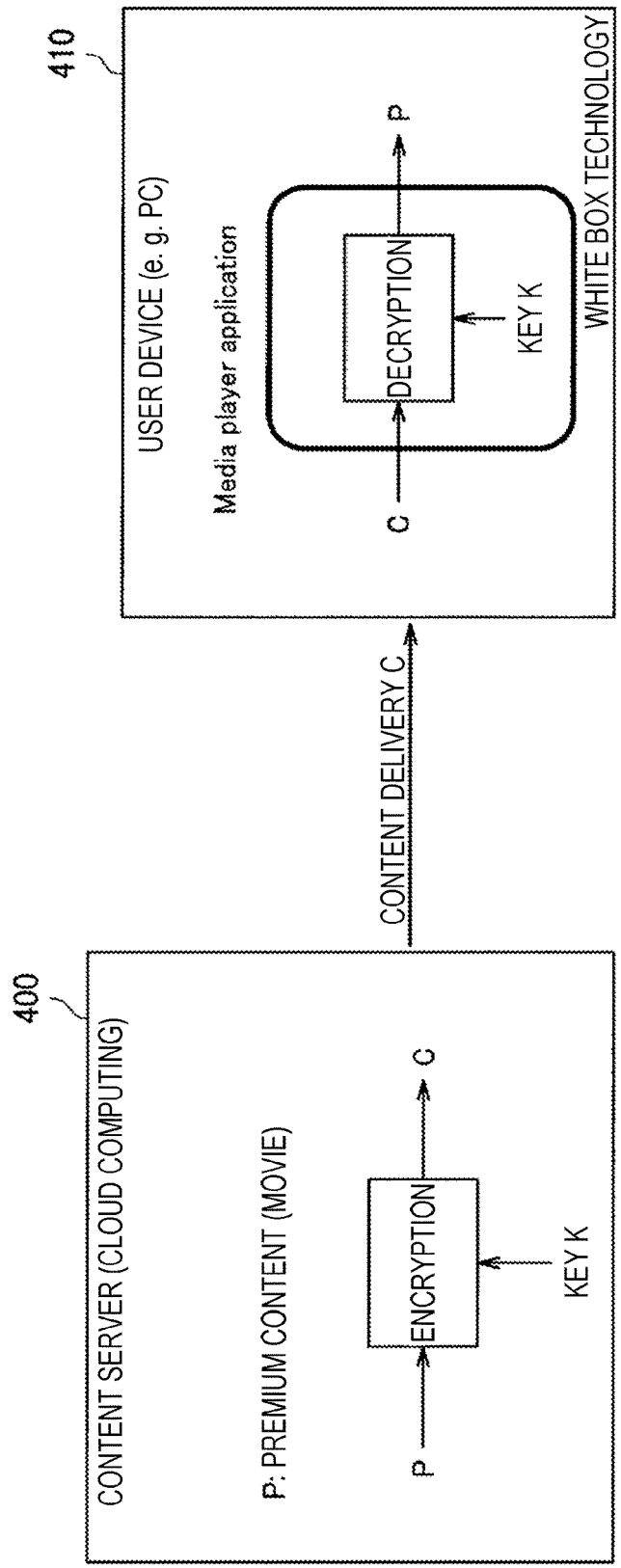
FIG. 25 is a schematic diagram illustrating an example applied to a copyright protection technique (digital rights management (DRM))

FIG. 25 is a schematic diagram illustrating an example applied to a copyright protection technique (digital rights management (DRM)). As illustrated in FIG. 25, a content server 400 on cloud computing conducts encryption, and content (ciphertext C) is delivered from the content server 400 to a user device 410. The user device 410 is an electronic device such as a personal computer (PC) and a smartphone. The content (ciphertext C) is decrypted by the user device 410.

Figure 26:
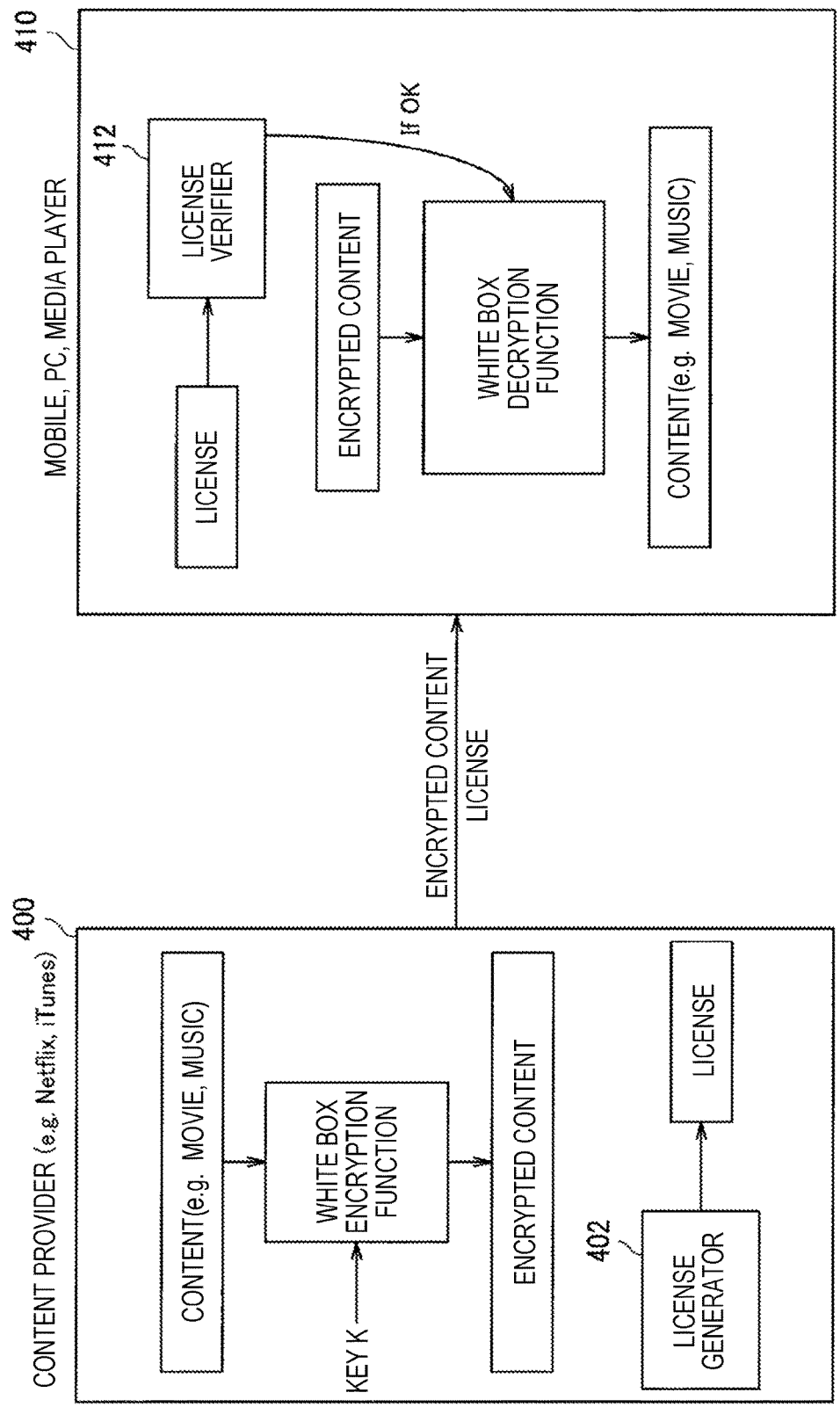
FIG. 26 is a schematic diagram illustrating FIG. 25 in more detail.

FIG. 26 is a schematic diagram illustrating FIG. 25 in more detail. The content server 400 encrypts content such as a movie and music by use of a white box encryption function. The content server 400 has a license generator 402 generate a license, and the license is transmitted to the user device 410 with the encrypted content. The user device 410 has a license verifier 412 verify the transmitted license. If the license is successfully verified, the user device 410 decrypts the encrypted content by use of a white box decryption function.

The copyright protection technique as illustrated in FIGS. 25 and 26 has to have the user device 410 decrypt content. In this case, if the key K were disclosed, content would be illegally delivered. In other words, the user device 410 is not reliable in environments of insecure encryption. According to the present embodiment, the white box encryption technique can surely prevent a malicious user from acquiring the secret key K of content.

Figure 27:
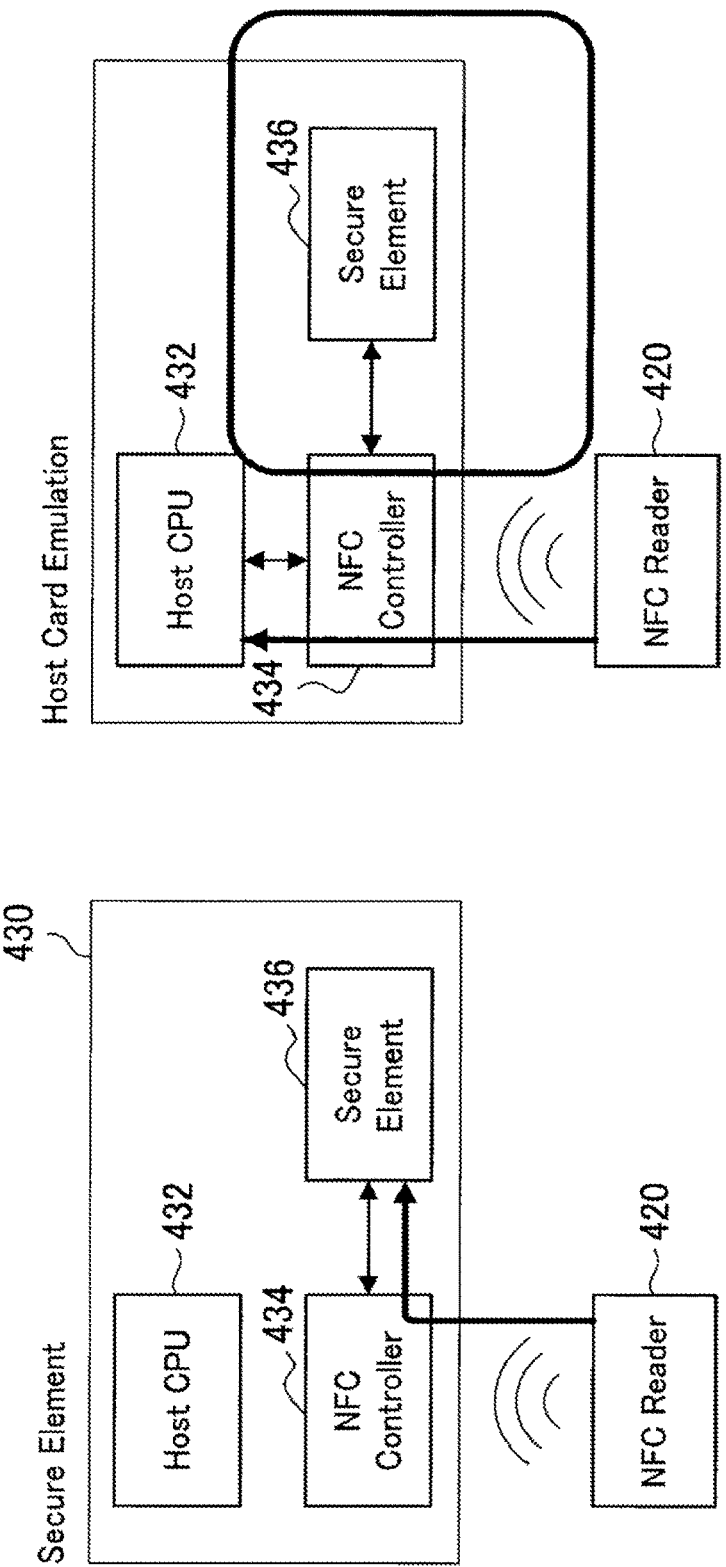
FIG. 27 is a schematic diagram illustrating an example applied to a payment system that uses NFC emulation.

FIG. 27 is a schematic diagram illustrating an example applied to a payment system that uses NFC emulation. As illustrated in FIG. 27, a user device 430 is brought close to a NFC reader 420 for emulation in this system. The user device 430 includes a host CPU 432, an NFC controller 434, and a secure element 436.

Figure 28:
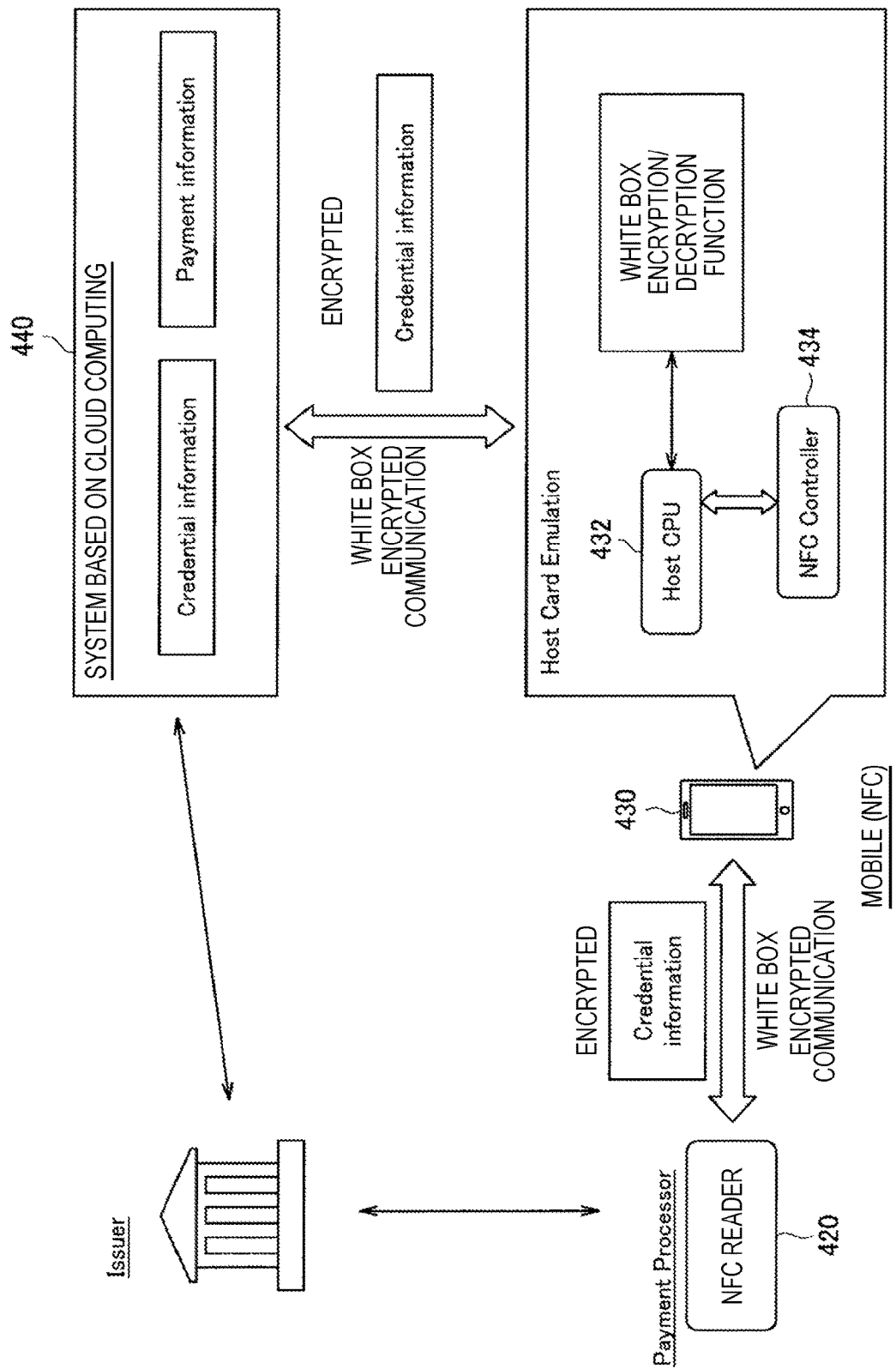
FIG. 28 is a schematic diagram illustrating FIG. 27 in more detail.

FIG. 28 is a schematic diagram illustrating FIG. 27 in more detail. A server 440 on cloud computing includes credential information and payment information on a user. The user device 430 is an electronic device such as a mobile device, and performs encrypted communication with the server 440 to exchange the credential information. Meanwhile, the user device 430 performs encrypted communication with the NFC reader 420 to exchange the credential information. The white box encryption according to the present embodiment is used for the encrypted communication. Accordingly, the user device 430 includes a white box cipher function and a decryption function. Conducting encryption by use of the white box encryption can protect credential data on payment, and makes NFC emulation possible even if the user device 430 does not include the secure element 436.

Figure 29:
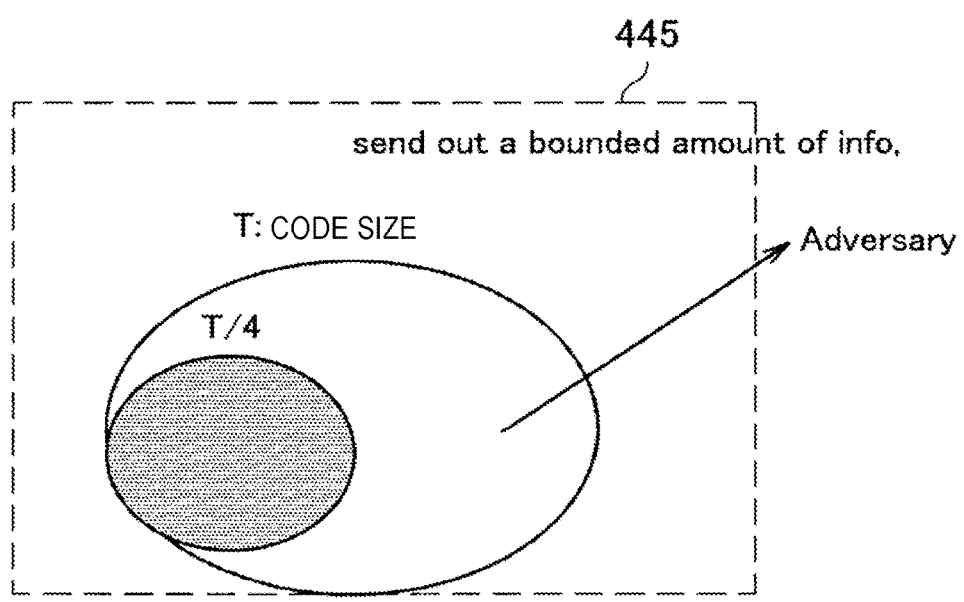
FIG. 29 is a schematic diagram illustrating a scheme that is secure against even a memory leak.

FIG. 29 is a schematic diagram illustrating a scheme that is secure against even a memory leak. This system ensures the security even if memory leaks because of the vulnerability (buffer overflow and Heartbleed) of the software and malware. The security of a device 445 having vulnerability to malware and a memory leak is not diminished because of the characteristics of Space hardness of the white box encryption scheme unless data of several Kbytes, several Gbytes, or more leak. If the example of FIG. 29 considers a code size as T, the security is not diminished unless data of T/4 or more leak. Additionally, Space hardness is a technique of ensuring the security of a cipher unless memory having a predetermined size or more leak. This method is effective especially when the amount of communication from the external network is limited from the internal network.

Figure 30:
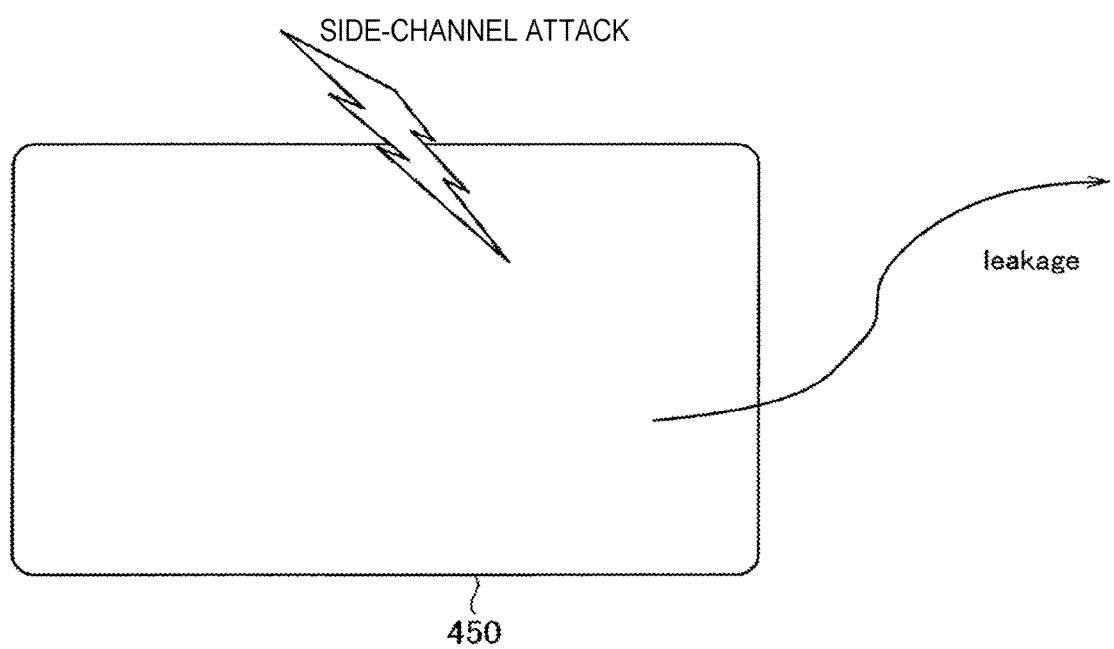
FIG. 30 is a schematic diagram illustrating an example of encryption that is secure against a side-channel attack.

FIG. 30 is a schematic diagram illustrating an example of encryption that is secure against a side-channel attack. The white box encryption scheme is typically dedicated to software, but can also be used for hardware as a secure encryption scheme for a side channel through implementation by reconfigurable hardware (FPGA). It is effective especially for a hardware device such as an IC card 450 illustrated in FIG. 30 which may be undergo a side-channel attack.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An encryption device including:
a data encryption unit configured to conduct encryption on the basis of a white box model in which at least a part of a plurality of round functions for sequentially conducting encryption processing on an input value is tabulated, and input and output values of the round function are recognizable from an outside,
wherein the plurality of round functions each have an encryption function that is tabulated and encrypts an input value in a black box model in which input and output values are recognizable from the outside and an intermediate value is not recognizable from the outside.

(2) The encryption device according to (1),
wherein a part of bits to be input into the round function is input into the encryption function, and
the encryption function sets a part of bits inputtable into the encryption function as a fixed value, and disregards a part of output values of the encryption function, thereby outputting an output value having a number of bits corresponding to a difference between a number of the bits inputtable into the encryption function and a number of the bits input into the encryption function.

(3) The encryption device according to (2),
wherein the round function operates an exclusive OR of a bit that is not input into the encryption function among the bits to be input into the round function, and a bit of the output value from the encryption function.

(4) The encryption device according to (3),
wherein the round function outputs a value of a bit input into the encryption function and a value of a bit obtained on the basis of the exclusive OR.

(5) The encryption device according to (4),
wherein the round function outputs the value of the bit input into the encryption function as a lower bit than the value of the bit obtained on the basis of the exclusive OR.

(6) The encryption device according to any one of (2) to (5),
wherein an exclusive OR of an output of the round function and a predetermined value decided in advance is operated, and a resultant value is used as an input into a next round function or an output of the data encryption unit.

(7) The encryption device according to (1),
wherein one of the round functions has a plurality of the encryption functions.

(8) The encryption device according to any one of (2) to (6),
wherein a round function in a more subsequent stage among the plurality of round functions has an input value of more bits input into the encryption function.

(9) The encryption device according to (1),
wherein one of the round functions has a plurality of the encryption functions,
bits to be input into the round function are divided and input into the plurality of encryption functions,
the plurality of encryption functions conduct non-linear operations, and
the round function conducts a linear transformation operation on a result of the non-linear operations by the plurality of encryption functions, and outputs the result.

(10) The encryption device according to (9),
wherein a number of bits to be input into each of the plurality of encryption functions is equal to a number of bits to be output.

(11) The encryption device according to (9) or (10),
wherein bits to be input into the plurality of encryption functions are different from each other in number.

(12) The encryption device according to any one of (1) to (11),
wherein the encryption function conducts encryption by using an extended key generated from a secret key corresponding to the data encryption unit.

(13) An encryption method including:
conducting encryption on the basis of a white box model in which at least a part of a plurality of round functions for sequentially conducting encryption processing on an input value is tabulated, and input and output values of the round function are recognizable from an outside,
wherein the plurality of round functions each encrypt an input value on the basis of an encryption function that is tabulated in a black box model in which input and output values are recognizable from the outside and an intermediate value is not recognizable from the outside.

(14) A decryption device including:
a data decryption unit configured to conduct decryption by an inverse operation of encryption processing of conducting encryption on the basis of a white box model in which at least a part of a plurality of round functions for sequentially conducting encryption processing on an input value is tabulated, and input and output values of the round function are recognizable from an outside,
wherein the plurality of round functions each encrypt an input value on the basis of an encryption function that is tabulated in a black box model in which input and output values are recognizable from the outside and an intermediate value is not recognizable from the outside.

(15) A decryption method including:
conducting decryption by an inverse operation of encryption processing of conducting encryption on the basis of a white box model in which at least a part of a plurality of round functions for sequentially conducting encryption processing on an input value is tabulated, and input and output values of the round function are recognizable from an outside,
wherein the plurality of round functions each encrypt an input value on the basis of an encryption function that is tabulated in a black box model in which input and output values are recognizable from the outside and an intermediate value is not recognizable from the outside.

What is claimed is:
1. An encryption device comprising:
processing circuitry configured to
conduct encryption on the basis of a white box model in which at least a part of a plurality of round functions for sequentially conducting encryption processing on an input value is tabulated, and input and output values of the round function are accessible from an outside entity,
wherein the plurality of round functions each has an encryption function that is tabulated and encrypts an input value in a black box model in which input and output values are accessible from the outside and an intermediate value is not accessible from the outside entity, wherein a part of bits input into the round function is input into the encryption function, and the encryption function sets a part of the bits input into the encryption function as a fixed value, and disregards a part of output values of the encryption function, thereby outputting an output value having a number of bits corresponding to a difference between a number of the bits input into the encryption function and a number of the bits disregarded by the encryption function.

2. The encryption device according to claim 1,
wherein the round function operates an exclusive OR of a bit that is not input into the encryption function among the bits to be input into the round function, and a bit of the output value from the encryption function.

3. The encryption device according to claim 2,
wherein the round function outputs a value of a bit input into the encryption function and a value of a bit obtained on the basis of the exclusive OR.

4. The encryption device according to claim 3,
wherein the round function outputs the value of the bit input into the encryption function as a lower bit than the value of the bit obtained on the basis of the exclusive OR.

5. The encryption device according to claim 1,
wherein an exclusive OR of an output of the round function and a predetermined value decided in advance is operated, and a resultant value is used as an input into a next round function or an output of the processing circuitry.

6. The encryption device according to claim 1,
wherein one of the round functions has a plurality of the encryption functions.

7. The encryption device according to claim 1,
wherein a round function in a more subsequent stage among the plurality of round functions has an input value of more bits input into the encryption function.

8. The encryption device according to claim 1,
wherein one of the round functions has a plurality of the encryption functions,
bits to be input into the round function are divided and input into the plurality of encryption functions,
the plurality of encryption functions conduct non-linear operations, and
the round function conducts a linear transformation operation on a result of the non-linear operations by the plurality of encryption functions, and outputs the result.

9. The encryption device according to claim 8,
wherein a number of bits to be input into each of the plurality of encryption functions for the one of the round functions is equal to a number of bits to be output.

10. The encryption device according to claim 8,
wherein bits to be input into the plurality of encryption functions for the one of the round functions are different from each other in number.

11. The encryption device according to claim 1,
wherein the encryption function conducts encryption by using an extended key generated from a secret key corresponding to the processing circuitry.

12. An encryption method, implemented by processing circuitry of an encryption device, comprising:
conducting encryption on the basis of a white box model in which at least a part of a plurality of round functions for sequentially conducting encryption processing on an input value is tabulated, and input and output values of the round function are accessible from an outside entity, wherein the plurality of round functions each encrypt an input value on the basis of an encryption function that is tabulated in a black box model in which input and output values are accessible from the outside entity and an intermediate value is not accessible from the outside entity, wherein a part of bits input into the round function is input into the encryption function, and the encryption function sets a part of the bits input into the encryption function as a fixed value, and disregards a part of output values of the encryption function, thereby outputting an output value having a number of bits corresponding to a difference between a number of the bits input into the encryption function and a number of the bits disregarded by the encryption function.

13. A decryption device comprising:
processing circuitry configured to
conduct decryption by an inverse operation of encryption processing of conducting encryption on the basis of a white box model in which at least a part of a plurality of round functions for sequentially conducting encryption processing on an input value is tabulated, and input and output values of the round function are accessible from an outside entity,
wherein the plurality of round functions each encrypt an input value on the basis of an encryption function that is tabulated in a black box model in which input and output values are accessible from the outside entity and an intermediate value is not accessible from the outside entity,
wherein a part of bits that were inputted into the round function were input into the encryption function, and
the encryption function set a part of the bits inputted into the encryption function as a fixed value, and disregarded a part of output values of the encryption function, thereby having outputted an output value having a number of bits corresponding to a difference between a number of the bits input into the encryption function and a number of the bits disregarded by the encryption function.

14. A decryption method, implemented by processing circuitry of a decryption device, comprising:
conducting decryption by an inverse operation of encryption processing of conducting encryption on the basis of a white box model in which at least a part of a plurality of round functions for sequentially conducting encryption processing on an input value is tabulated, and input and output values of the round function are accessible from an outside entity,
wherein the plurality of round functions each encrypt an input value on the basis of an encryption function that is tabulated in a black box model in which input and output values are accessible from the outside entity and an intermediate value is not accessible from the outside entity,
wherein a part of bits that were inputted into the round function were input into the encryption function, and
the encryption function set a part of the bits inputted into the encryption function as a fixed value, and disregarded a part of output values of the encryption function, thereby having outputted an output value having a number of bits corresponding to a difference between a number of the bits input into the encryption function and a number of the bits disregarded by the encryption function.

* * * * *